(12) United States Patent
Wallace

(10) Patent No.: US 10,987,643 B1
(45) Date of Patent: Apr. 27, 2021

(54) SYSTEM AND METHOD FOR PROVIDING APPLIANCE OPERATIONS ASSOCIATED WITH A RECIPE

(71) Applicant: Perfect Company, Inc., Vancouver, WA (US)

(72) Inventor: Michael Wayne Wallace, Vancouver, WA (US)

(73) Assignee: Perfect Company, Vancouver, WA (US)

(*) Notice: Subject to any disclaimer, the term of this patent is extended or adjusted under 35 U.S.C. 154(b) by 557 days.

(21) Appl. No.: 15/844,283

(22) Filed: Dec. 15, 2017

(51) Int. Cl.
| | | |
|---|---|---|
| *B01F 15/00* | (2006.01) | |
| *A47J 31/00* | (2006.01) | |
| *A47J 43/07* | (2006.01) | |
| *A47J 43/046* | (2006.01) | |
| *G06F 16/242* | (2019.01) | |

(52) U.S. Cl.
CPC ....... *B01F 15/00305* (2013.01); *A47J 31/002* (2013.01); *A47J 43/046* (2013.01); *A47J 43/0716* (2013.01); *B01F 15/00253* (2013.01); *B01F 15/00311* (2013.01); *G06F 16/2428* (2019.01); *B01F 2215/0014* (2013.01)

(58) Field of Classification Search
CPC ...... H05B 6/6447; H05B 6/647; H05B 6/687; H05B 6/688; A23L 1/00; A23L 3/00; A23L 5/00; A23P 10/00; G05B 15/02; Y02B 40/143; Y02B 40/00; A23V 2002/00; G06Q 10/10

USPC ........ 700/266, 9, 28; 702/19, 22, 23, 30–32; 99/275, 325, 337, 468, 486; 426/231, 426/278

See application file for complete search history.

(56) References Cited

U.S. PATENT DOCUMENTS

| | | | | |
|---|---|---|---|---|
| 5,954,640 | A * | 9/1999 | Szabo | G16H 20/60 600/300 |
| 2002/0163436 | A1 * | 11/2002 | Singh | F25B 49/005 340/584 |
| 2007/0269557 | A1 * | 11/2007 | Culver | G16H 20/60 426/72 |
| 2012/0016814 | A1 * | 1/2012 | Evans | G06Q 99/00 705/500 |
| 2013/0327231 | A1 * | 12/2013 | Holman | A23P 10/00 99/486 |
| 2015/0118659 | A1 * | 4/2015 | Meyer | G16H 20/60 434/127 |

* cited by examiner

*Primary Examiner* — Shogo Sasaki
(74) *Attorney, Agent, or Firm* — Rylander & Associates, PC; Philip R. M. Hunt

(57) ABSTRACT

A system and method directed to the partial or full automation of recipe processing by an appliance is described. A recipe may include one or more of at least a portion of operating code, one or more appliance operation(s) or one or more action(s) to initiate operation of the appliance. A computing device may include a recipe processing application that generates a display on a user interface. The display may include one or more indications of the partial or full automation of appliance operations for processing recipe ingredients. The appliance is a blender in one example, and the appliance operations are for processing the recipe ingredients by the blender.

19 Claims, 20 Drawing Sheets

FIG. 4B

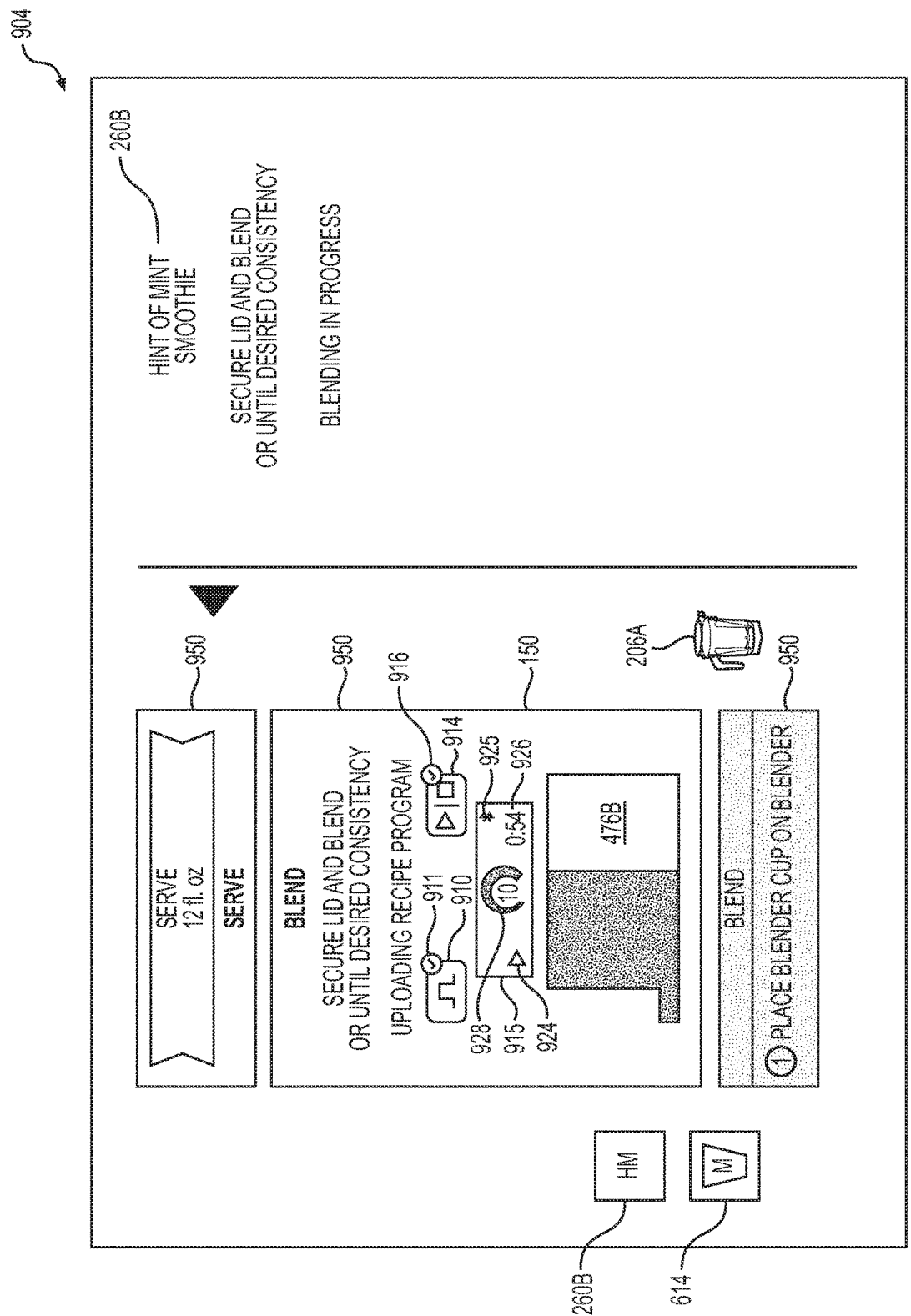

SYSTEM AND METHOD FOR PROVIDING APPLIANCE OPERATIONS ASSOCIATED WITH A RECIPE

BACKGROUND

One common method of preparing foodstuffs is to utilize recipes. Each recipe may include a list of ingredients and actions for executing the recipe. The actions may be based on the recipe ingredients and instructions for processing the ingredients. For example, after adding the ingredients to a container in which they will be processed, the instructions may further detail the processing, such as mixing, blending, frying, sautéing, baking, or similar. The processing may include one or more appliances. Generally, a person preparing the foodstuff (or executing a recipe, hereinafter referred to as a user), measures and adds one or more ingredients to a mixing container and, where applicable, identifies an appliance that may be used to process the ingredients. The selection and operation of the appliance may impact the quality of the foodstuff. For example, in the case of a recipe for a blended beverage (such as a protein shake or a frozen coffee beverage), the selection and operation of a blender with which to process the blended beverage may impact the quality of the beverage.

In addition, the selection of containers and the selection and operation of appliances associated with recipes impact the quality of foodstuffs. In particular, a container in which ingredients are combined and/or an appliance employed to thereafter process the ingredients may have characteristics that impact the processing. For example, for recipes including a processing step in which a blender is used, there may be individual blender containers (or cups) that include specifications relevant to the quantity of the recipe (such as the recipe volume). In one example, a personal-inverted blender container may have a maximum volume capacity. It also may have a size or shape of a blade with specifications that are ideal for certain types of ingredients (such as liquid versus solid, or different densities of liquids). Other larger containers, such as containers with a built-in blade, may have a broader range of processing capabilities but may be suboptimal for some recipes or volumes of recipes. These container specifications may support recommendations associated with recipes for processing, such as blending. As a result, there is a need to improve the optimal selection of containers for recipes as a basis to optimize the processing operations performed on the recipe ingredients.

Similarly, appliance selection and operation may have competing characteristics from the standpoint of foodstuff preparation. On the one hand, a basic blender with simple data entry for operation, such as start and stop buttons, and several blender push-button modes (such as, for example, stir, chop, mix, puree, liquefy, pulse mode, crushed ice, or similar) may offer limited button operations. However, they may be inadequate on a more sophisticated operational level as may be needed in a commercial setting in order to rapidly and repeatedly prepare foodstuffs with varying serving sizes and pre-advertised features (such as density, thickness or consistency of ingredient integration, or similar). On the other hand, more sophisticated blenders with a variety of options for operations, multiple steps and/or multiple phases of operation (such as, for example, pulsing with or without push-button modes, or altering blender speeds and time periods per phase) may produce a more precise and sophisticated variety of beverages in a commercial setting, yet be more difficult for the user to execute. As a result, there is a need to improve the optimal selection and operation of appliances for foodstuffs.

In addition, generally, the execution of recipes in a commercial setting adds complexity to preparing foodstuffs. There may be a variety of recipes, with each recipe being prepared in multiple serving sizes. The recipe instructions, as well as the selection and operation of containers and appliances, also may differ as a function of the selected serving size. A user may prepare a recipe repeatedly with different serving sizes. A user similarly may prepare multiple unique recipes, with each recipe once again being executed with different serving sizes. A commercial setting may have advertised or expected characteristics of the recipes as processed, for example, a given density, consistency, thickness or ingredient integration for a blended beverage or individual ingredients, such as crushed ice, or similar. These characteristics demonstrate a need to improve in the operation of appliances for the repetitious preparation of recipes with different serving sizes, particularly in a commercial setting.

BRIEF DESCRIPTION OF THE DRAWINGS

FIG. 4A-4C are illustrative data structures showing data sets and data flows, graphs and data about the graphs among various data sets and graphs associated with the systems and methods for processing recipes that include appliance data and/or actions to support the operation of appliances.

FIGS. 9A-9C depict schematic diagrams of an illustrative example of systems and methods based on an appliance, including a recipe processing app providing an exemplary display option and feedback for the operation of the appliance.

Figure 1:
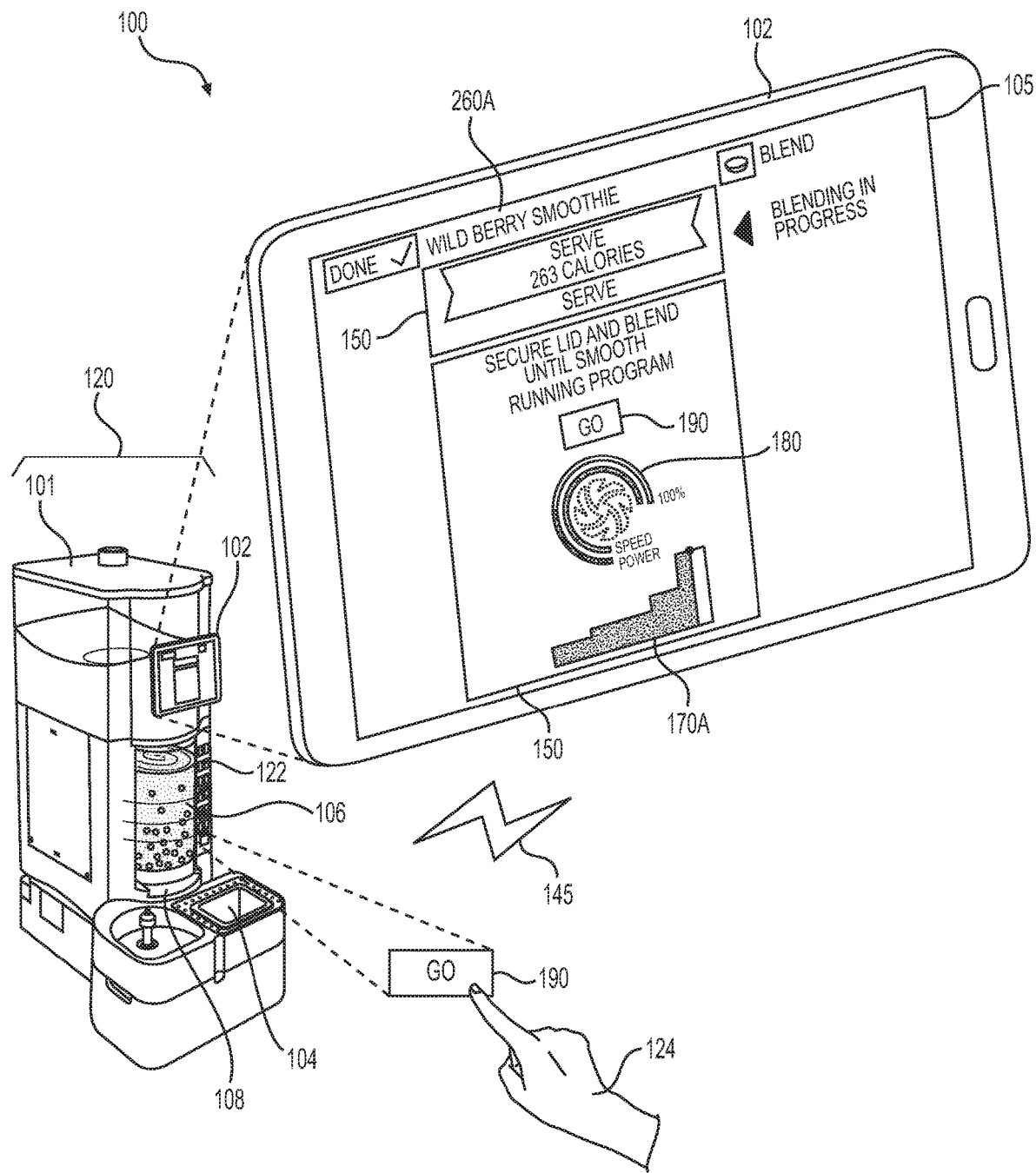
FIG. 1 is a schematic diagram of an illustrative computing environment of systems and methods usable to provide an appliance and a computing device for processing a recipe.

While implementations are described herein by way of example, those skilled in the art will recognize that the implementations are not limited to the examples or drawings described. The drawings and detailed description thereto are not intended to limit implementations to the particular form disclosed but, on the contrary, the intention is to cover all modifications, equivalents and alternatives falling within the spirit and scope as defined by the appended claims.

When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. In addition, the use of directional terms such as "upper," "lower," "above," "underneath" or similar, are intended to describe the positions and/or orientations of various components of the invention relative to one another as shown in the various figures and are not intended to impose limitations on any position and/or orientation of any embodiment of the invention relative to any reference point external to the reference.

DETAILED DESCRIPTION

This disclosure is generally directed to systems and methods for preparing foodstuffs from recipes with an improvement in the operation of one or more appliances to process recipe ingredients. The improvement may include partially or fully automated processing by appliances. The systems and methods of the present disclosure involve associating appliance operations with a recipe and transmitting at least a portion of operating code and/or one or more appliance operation(s) (also referred to as appliance data) to appliances that process the recipe ingredients. The systems and methods of the present disclosure may also involve providing feedback to guide a user in monitoring the accurate processing the recipe ingredients. The guidance may include the receipt of one or more indications of the partial or fully automated operation of appliances for users on a display generated by a recipe processing application (app). The recipe processing app receives data about the processing by the appliances in order to generate the one or more indications. The systems and methods of the present disclosure involve receiving a recipe from a server, with the recipe including ingredients and one or more recipe actions associated with appliance operations. Alternatively, the systems and methods of the present disclosure involve receiving a recipe from a server, with the recipe including ingredients and appliance data associated with at least a portion of operating code and/or one or more appliance operation(s) for an appliance. In further alternative systems and methods, a recipe processing application receives a recipe from a server and identifies an appliance in the environment. The detected appliance includes at least a portion of operating code and/or one or more appliance operation(s) that are then associated with the recipe by the recipe processing application. The associated appliance may be a blender, and the appliance operation(s) may be for processing the recipe ingredients by the blender.

In one example of the present systems and methods, the use of a blender appliance for executing a recipe may involve a complex sequence of one or more blender operations. Examples of specific blender operations may comprise a specific power level, a specific rotation speed, and/or a specific duration, or similar. Each of the one or more blender operations also may represent one or more portion(s) of operating code to operate the blender. A recipe processing app may be capable of interacting with the blender. The recipe processing app may also be capable of controlling the operation of the blender on a partial or fully automated basis. The recipe processing app may further be capable of this control based on a remote connection to the appliance through a network. The recipe processing app may further receive data to control the blender. The data may be at least a portion of operating code associated with one or more of the recipe, a container in which the recipe ingredients are processed and/or the blender appliance (or other blender appliances or categories of blender appliances, or similar) that processes the ingredients. The data alternatively may be one or more appliance operation(s) based on data about operating parameters for recipes, recipe ingredients, containers and/or appliances, as well as categories related to each of these. The data may be further generated based on other factors in the environment in which the recipe is executed, such as available containers and/or appliances. The data may be further derived from a combination of one or more of these approaches in alternative examples.

The at least a portion of operating code and/or one or more appliance operation(s) may alternatively be dependent upon characteristics or operating parameters associated with one or a combination of a recipe, a container or an appliance. With a combination of multiple sources for characteristics or parameters, the operating code and/or appliance operations may be an average of the data from each contributing characteristic or parameter. The operating code and/or appliance operations may further alternatively be dependent upon one or more of the recipe, container or appliance with one source as a primary contributor or another priority organization of the sources. For example, with a priority relationship, a primary source, such as the recipe, may contribute a higher percentage of characteristics or operating parameters than a secondary source, such as the container or the appliance, with percentages such as 60%, 75% or 90% as examples.

In one example of the present systems and methods, the recipe processing app may be capable of recording the operation of an appliance, such as a blender appliance. More particularly, the recipe processing app may be capable of sensing the power, speed and/or duration of a blender operation, or similar. This process may occur prior to executing the recipe by the user, such as in a central source environment, and transmitted for receipt by the recipe processing app as part of a recipe or at a later time associated with a recipe. In alternative systems and methods, the recipe processing app may record an execution of a recipe by a user and save the recordation in order to provide at least a portion of operating code and/or one or more appliance operation(s) for subsequent use by the user, or in a local store environment. More particularly, in one example, the operating code to control the operation of the blender appliance may be generated based on a sample operation of the blender appliance that is recorded, duplicated or otherwise replicated, or similar. The recorded sequence also may be part of the appliance data. The recorded sequence may be stored as appliance data in the form of metadata associated with a recipe in permanent or temporary storage. The appliance data may be in the form or a portion of operating code, full operating code, or one or more appliance operation(s), or another form of data usable to support the operation of appliances, or similar. When a recipe with a recorded sequence is executed by a user, the user may be presented with a representation of the recording, such as in the form of one or more indications. These indications may take the form of graphs or other visual indications, audio, video, or similar, indications and may be referred to as an appliance program. More particularly, the appliance program may support a visual representation of the operation of an appliance on a display generated by the recipe processing app, including where the appliance program is based alternatively on at least portion of operating code and/or one or more appliance operation(s). The display may provide one or more indications of the appliance operation based on the recorded sequence. The recorded sequence may be transmitted to the blender for automated processing of the blender. Another approach for generating the data to control the blender appliance is that the recipe processing app receives operating code for a sequence of blender operations.

The appliance data may be stored as metadata associated with a recipe in a permanent or temporary storage. When a recipe with a recorded sequence is executed by a user, the sequence may be converted into manual operations or partial or full automated operations. The user may then be presented with a specific list of blender operations to perform manually, or a portion of the operations may be manual with the remainder being automated. The user may also be presented with one or more indications of an appliance program or other representation of the operation of an appliance (including, for example, a textual description that the appliance is operating). As an alternative, when a recipe with a recorded sequence is executed by a user, the recipe processing app may remotely control the blender appliance to replicate a portion or all of the recorded sequence of blender operations. Then, all or a portion of the operating code may be stored either in a central source environment or a local store environment, including by the recipe processing app as part of a local store environment, for use by the recipe processing app for controlling the blender appliance. In another example, an employee may record the operation of a blender appliance in a central environment, generate at least a portion of operating code and associate one or both of the identification of the blender appliance and the operating code for the blender appliance with the recipe.

In other examples, operating code for the blender appliance may be transmitted to the local store environment separately. It may thereafter be accessed based on an identification and/or a selection of the appliance during recipe execution. Based on the identification and/or the selection of the appliance, all or a portion of the operating code for the appliance may be acquired from a storage source provided by the appliance manufacturer, a third party resource, a public resource, or similar. In still further examples, the blender appliance identification may be sufficient to trigger an automated program that is preset and stored in a storage source in the application or accessible by the appliance. In this case, the recipe processing app may provide an identification of the appliance or the app may provide a data entry option for the user to enter a selection of the appliance. In yet another example, the recipe processing app may connect through a network and establish a communication link with one or more appliance(s). This communication link may be another basis for the identification and detection of one or more appliance(s) by the recipe processing app. Once detected, the communication link may enable the receipt by the recipe processing app of more data about the operation of the appliance(s).

In another example, instructions to operate an appliance may be included in a recipe received from a server or a storage source within a local store environment, or a portion of the instructions may be included in a recipe and a portion may be stored in the local store environment. Examples of apportioned instructions are the following: the recipe includes an identification of the appliance and the instructions (such as, a portion of operating code or full operating code) to operate the appliance are provided locally; an initial instruction is received from the server and updates are generated locally; or, an initial instruction is received from the server, a portion of updates are provided locally and a portion is provided by the server. Where a portion or all of any updates to instructions are generated locally, the updates then may be transmitted to the server, which may then prompt updates to the instructions being redistributed to additional local environments.

In additional examples, the data and metadata for a recipe may include data regarding optimal, minimum and maximum characteristics of appliance operations, such as for a blender for individual and a sequence of operations. A sequence of operations may be presented in combination or in parallel (such as, where one action may be executed during a time period for the completion of another separate action). The characteristics of one or more blender operations may be dependent on the total weight of a recipe mixture, the size and shape of a blender container, the specific nature of ingredients including substitute or discrete ingredients, and other factors related to the recipe, the recipe ingredients, the blender container or an appliance. In this way, the recipe processing app may be able to set parameters for operation of appliances based on features of recipes. These parameters may, therefore, enable the recipe processing app to generate more detailed instructions, at least a portion of operating code and/or one or more appliance operation(s). The new recipe data structure of either appliance data and/or appliance operation(s) improves the functioning of the appliance by applying an automated portion of or full operation of the appliance. The automated operation may be optimized so that the appliance is run at its peak performance levels. In additional examples, the peak performance levels may also take into account characteristics of the recipe and/or the container. Even where the automated operation is not optimized specifically for the appliance, it still may provide a better execution outcome than a user manually operating the appliance or following guided instructions for operating the appliance. More particularly, even with guidance, the user may introduce operational errors.

As used in this document, a "foodstuff" is any substance that may be consumed as food. A foodstuff may be a single raw item such as an apple or pear. A foodstuff may be a single raw item that has been processed or prepared in some manner, such as a hard-boiled egg. A foodstuff may be an aggregation of items prepared according to a recipe. The ingredients of a foodstuff may be liquids, solids, gels, suspensions, or combinations of such substances, or similar. A "discrete" foodstuff is one that can be presented based on one or more measurement unit(s) for measuring the ingredient, instead of or in addition to other measurement approaches, such as weight, volume, density, or similar. Examples of discrete ingredients are strawberry, grape, and Oreo™ cookie, each of which is typically added to a recipe in single indivisible units.

As used in this document, a "recipe" may include two or more ingredients and at least one of appliance data or one or more actions undertaken to prepare a foodstuff. In an alternative example, the recipe may include two or more ingredients and both of appliance data and one or more actions. A recipe commonly lists multiple ingredients, each of which may be associated with a quantity that may be specified with greater or lesser precision. Listing an ingredient in a recipe implies the step of measuring that ingredient. As used herein, a "recipe mixture" comprises two or more ingredients admixed together. A recipe may involve more than one recipe mixture, and two recipe mixtures may be admixed to create a further recipe mixture. The appliance data may indicate at least a portion of operating code to operate an appliance. In one example, the action may include transmitting the portion of the operating code to the appliance. In a further example, the appliance data may include one or more appliance operation(s) with which an appliance is operated. In an alternative example, the recipe may include two or more ingredients and at least one action, where the action is one or more appliance operations. Examples of an appliance operation are a process by which the recipe ingredients are processed, such as blending, sautéing, baking, or similar.

The operating code, appliance operations, actions, or similar, for the operation of the appliance, may be represented on the user interface for feedback to the user as a portion of an appliance program or multiple appliance programs. As used in this document, an "appliance program" includes one or more indications on a display of the user interface associated with operating an appliance: at least a portion of operating code or complete operating code for one or more appliance operations; settings, characteristics, operating parameters, or similar; one or more appliance operations, such as, for example a recording of a prior appliance operation or a sequence of appliance operations that may be replicated; or, an action of operating an appliance; or similar.

In one example, the appliance may be a blender. As used in this document, a "blender program" includes one or more indications on a display of the user interface associated with operating a blender: at least a portion of operating code or complete operating code for one or more blender operations; settings, characteristics, operating parameters, or similar; one or more appliance operations, such as, for example a recording of a prior blender operation or a sequence of blender operations that may be replicated; or, an action of operating a blender; or similar.

Successive activities associated with a recipe are herein termed "recipe actions," "recipe instructions" and/or "recipe steps." A recipe action, instruction or step may be, for example, the measurement of a quantity of a substance. Additional recipe actions, instructions or steps may include, for example, the identification of one or more ingredients to process in the recipe such as a first ingredient to measure, the next ingredient to process or measure, or similar. Actions performed to execute the recipe may include as follows: identify a container in which to place one or more ingredients; place the container on a scale; set the container aside; replace the container with another container; place one or more ingredients in a separate container; combine ingredients in separate containers; irreversibly mix ingredients together; physically alter one or a combination of ingredients through a process such as blending, sautéing, baking, or the like; mingle ingredients or sets of ingredients without admixture; place the container on or in an appliance; operate the appliance; enter one or more pieces of data to operate the appliance; take one or more actions to initiate operation of one or more appliances; monitor or change the operation of one or more appliance(s); perform a quality check of the foodstuff; remove the foodstuff from the appliance; place the foodstuff in a serving container; measure one or more properties of the foodstuff for another quality check; or similar. A recipe step may comprise manipulating a device preparatory to a further recipe step, for example, preheating an oven preparatory to baking an assemblage of recipe ingredients. A recipe step may comprise utilizing a device to perform an action upon one or more ingredients, such as baking a cake mix.

As used herein, the terms "execute," "executing," "execution," "combine," "combining," "prepare" and "preparing" refer to the successive completion of one or a sequence of recipe actions, instructions or steps comprising a recipe, or making a recipe or combining one or more ingredients as part of making a recipe.

As used herein, a "recipe block" is a graphical representation of a recipe ingredient (and, in some examples, the measurement of the ingredient), action, instruction and/or step, comprising a graphical user interface (GUI) element, being a sub-region (or alternatively, other portions of the display or another display) of the display area, defined by a boundary and rendered in a manner to distinguish it from the background and other sub-regions of the display. A recipe block may persistently show the state of completion of an associated recipe action, such as measuring an ingredient or processing recipe ingredients. A recipe block may be, as examples, a "recipe action block" or a "recipe ingredient block."

As used herein, a "recipe action block" is a graphical representation of a recipe action, instruction or step that may define an activity other than the measurement of an ingredient.

As used herein, one type of recipe action block is a "recipe blend block," or a graphical representation of one or more operations using a blender appliance or a portion of another or combination appliance including a blender function. The operation(s) using a blender appliance may include a variety of blender operations.

As used herein, a "recipe ingredient block" is a graphical representation of the type and amount of an ingredient to be measured for addition to a recipe mixture; a recipe ingredient block implies the act of measuring the associated ingredient and the recipe ingredient block may dynamically present the changes to one or more characteristic(s) of the ingredient in order to provide feedback to the user.

As used herein, an "active" or "activated" recipe block is one that is the current focus of activity in the execution of a recipe. In one example, a recipe may have at most one active recipe block at any moment. An active recipe block may be denoted by modifying the color, weight, or style of the border of the block, or may be denoted by modifying the size, position, or visual content of the recipe block, as well as other indications such as audio or video, as further described below, or similar. In other examples, a recipe may have multiple active recipe blocks being processed at any moment.

As used herein, a "nutrient" is an edible substance that provides utility to the human body when consumed. A foodstuff may include one or more nutrients, each of which provides utility. Examples of nutrients include minerals such as zinc and manganese. Further examples of nutrients include vitamins, proteins, carbohydrates, fat, and sugars. The utility that a nutrient provides to the human body is termed herein its "nutritional value". As used herein, the term "nutrient" also includes calories. The caloric content of a foodstuff provides energy, but may or may not provide other nutritional value when consumed.

As used herein, "nutritional data" may be defined to include or to be equated with the variety of terms and phrases for conveying nutritional data about recipes, including nutritional information, nutrition information, nutrient data, nutrient amount, nutrition data, serving size, number of servings, amount per serving, portions, serving portions, or similar. Nutritional data also may include one or more nutrient amounts, such as an individual nutrient amount of weight or a combination of weight and calories. Examples of nutrient amounts are: a measurement of the number of calories, as well as a weight, a volume, a density, a size, a length, or a weight of a protein, a fat, carbohydrates, calories, dietary fiber, vitamins, minerals, fatty acid, sugar, or another indication of nutrition, or similar. Nutritional data further may be determined for an ingredient, two or more ingredients, a recipe, a number of servings or a serving size of a recipe. In addition, nutritional data or amount may include information relating to additional daily dietary recommendations such as those based on a recommended daily allowance (RDA).

As used herein, an "app" or "application" is an executable computer program running on a computing device and presenting a graphical user interface (GUI) on the display surface of the computing device.

As used herein, the term "real-time" refers to the speed of response of a computer measurement and display system. As used herein, the term "essentially real-time" or "approximately real-time" refers to the provision of feedback to the user with a sufficiently brief latency to allow a novice user to operate the system without difficulty, with minimal or no training. In practice, as one example, a latency of 0.1 seconds may allow a user to feel that a system is reacting instantaneously. In another example, these phrases may be used to indicate processing as quickly as is practicable, and/or as may be achieved within the capability of human interaction or responses in the utilization of the methods and systems. The processing also is impacted by the latency inherent with communication protocols, hardware limitations, and software execution.

As used herein, the pronoun "he" is intended to mean he or she, referring to a person irrespective of gender. Similarly, the possessive "his" is intended to mean his or hers, referring to a person irrespective of gender.

These characteristics of the methods and systems of the present disclosure improve the execution of recipes based upon improving the operation of one or more appliances that process the ingredients of the recipes, while reducing the need for extensive training. This approach is particularly applicable in commercial settings where repetition and constant changes in serving sizes heighten the chance of error due to fatigue or distraction and, thereby, increase the chance of foodstuff waste and unproductive time for employees. In addition, improving the precision of ingredient processing increases the quality of the overall foodstuff as it is served to the consumer. Where there is a sequence of processing steps in operating an appliance, the precision execution of each processing step increases the accuracy of subsequent processing, and thereby builds quality into each processing step.

More particularly, following the addition of recipe ingredients to one or more containers, subsequent recipe actions may provide automation of a portion of the operation of an appliance or the entirety of operation of an appliance. In addition, recipe actions may provide additional guidance to a user prior to and/or after the automated operation of the appliance. For example, one or more of the following actions may be guided for the benefit of the user who interacts with the appliance: locate a container with recipe ingredients in the subject appliance, such as a blender; detect an appliance within a local environment; identify from a list of available appliances associated with a recipe and/or a container the appliance that is detected; identify the data associated with the operation of the appliance that is detected (such as at least a portion of operating code and/or one or more appliance operation(s)); establish a communication with the appliance; initiate the transmission of appliance data and/or actions to the appliance; provide input that the appliance operation is in progress and/or completed; provide data entry for partial manual control of the appliance; initiate the partial automated or fully automated operation of the appliance; provide override data entry related to the appliance operation; and/or, cancel the communication with the appliance; or similar. In other examples, any one or more of these actions may be automated with a portion of automated appliance operations or a full automated appliance operations.

Figure 2:
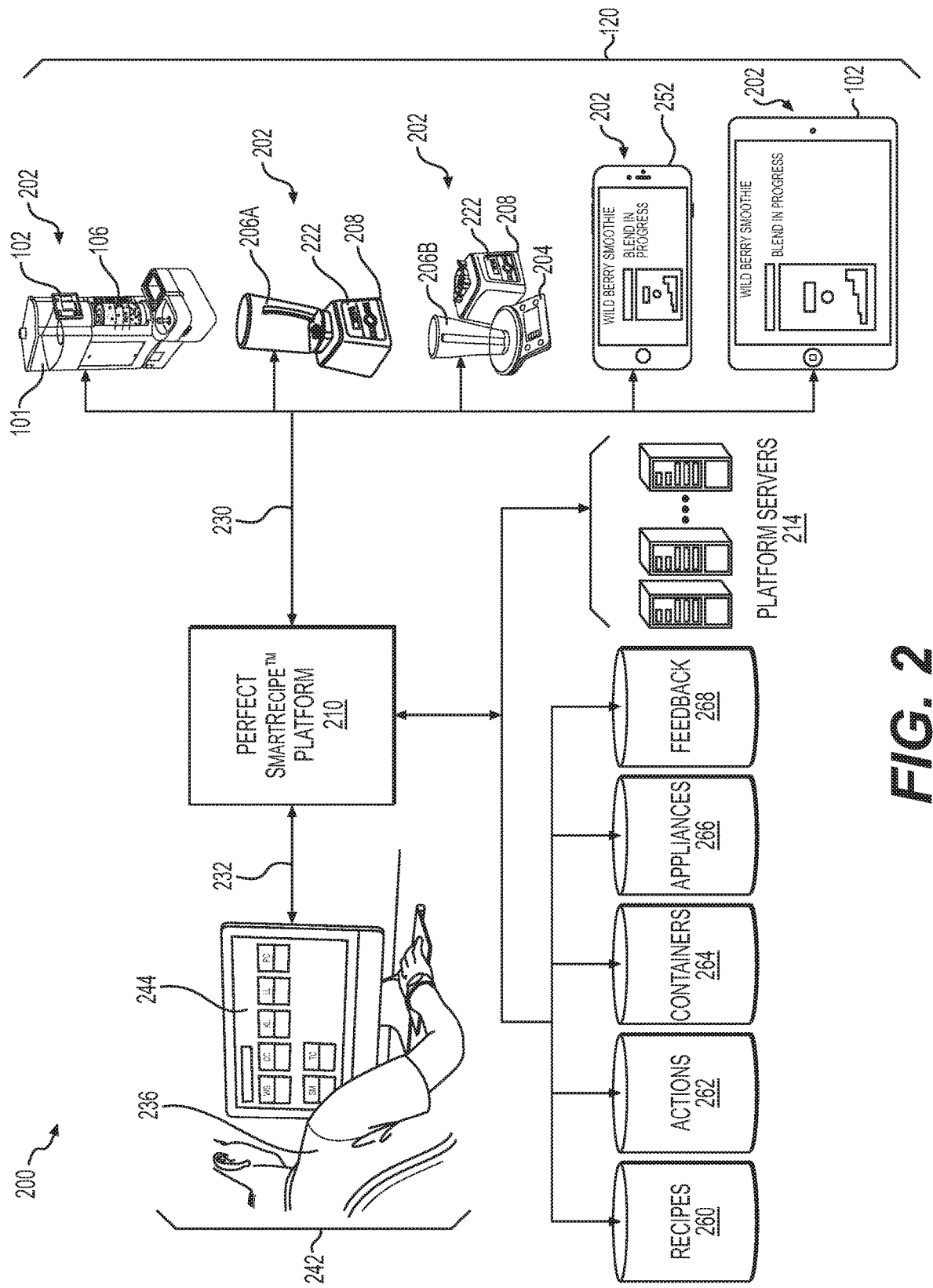
FIG. 2 is a schematic diagram of an illustrative computing environment including the Perfect SmartRecipe™ Software-as-a-Service (SaaS) Platform usable to provide a recipe for use in a local.

FIG. 1 is a schematic diagram of an illustrative computing environment of systems and methods 100 usable to provide an appliance 101 and a computing device 102 for processing a recipe (shown in FIG. 2 as recipe 260). The appliance 101 in this example is a combination appliance, including a scale 104 and a blender 108 that are integrated into the housing of the appliance. The device 102 may be associated with the appliance 101 through a network 145. A recipe processing application (shown in FIG. 2 as recipe processing app 202) may be installed on the computing device 102. The recipe processing app 202 may be configured to establish communication and interact with the appliance 101. The recipe 260 received by the recipe processing app 202 may include two or more ingredients (shown in FIG. 4 as ingredients 416) and at least one of appliance data (shown in FIG. 4 as appliance data 430) or one or more actions (shown in FIG. 2 as actions 262) undertaken to prepare a foodstuff. In an alternative example, the recipe may include two or more ingredients 416 and both of appliance data 430 and one or more actions 262. The appliance data 430 may indicate at least a portion of operating code (shown in FIG. 4 as operating code 435) to operate the appliance 101. In one example, the action 262 may include transmitting the portion of the operating code 435 to the appliance 101. In a further example, the portion of the operating code 435 may include one or more appliance operations (shown in FIG. 4 as appliance operations 436) upon which an appliance is operated. In an alternative example, the recipe 260 may include two or more ingredients 416 and at least one action 262, where the action 262 is one or more appliance operation(s) 436. Examples of an appliance operation 436, or a process by which the recipe ingredients 416 are processed, including blending, mixing, frying, sautéing, or similar. In this example, the processing is blending and the appliance operations are for the blender 108 of the integrated appliance 101. The appliance 101 also shows the container 106 within the blender 108 of the integrated blender and scale appliance 101 in operation.

The recipe processing app 202 presents one or more indications of the appliance data 430 and/or actions 262 about the appliance 101 processing on a user interface (UI) 105 of the device 102. The operating code 435, appliance operations 436, actions 262, or similar, for the operation of the appliance may be represented on the UI 105 as a portion of an appliance program (shown in FIG. 4 as appliance program 434), a complete appliance program 434 or multiple appliance programs 434. As shown in FIG. 1, one example of an appliance program 434 is a blender program 434. The blender program 434 may be further represented on the UI 105 in the form of a graph 170A. The characteristics shown on the blender program graph 170A may include measurements of time or duration represented on the x-axis and speed or power represented on the y-axis. The graph 170A also is further shown and described in FIG. 4B. The blender program 434 may further be represented additional data on the UI 105. In this example, the blender program 434 representation may include a circular dynamic icon 180 with a rotational feature surrounded by two concentric portions of circles. Like the y-axis of the blender program graph 170A, the two concentric portions of circles around the rotational feature may be associated with measurements of speed and/or power of the blender 108 as it is operating. Also, the rotational feature as a dynamic component may provide an indication of the on or off status of operation of the blender 108.

The operation of the blender 108 may result from the execution of operating code 435 and/or appliance operations 436. The appliance operation(s) 436 may be triggered automatically (as further described and shown in FIGS. 8A-8B below) or may include a manual aspect. In this example, a manual aspect is included for initiating the operation of the blender 108 portion of the appliance 101, while subsequent operations including speed and duration are then automated. More particularly, a user 124 may be an employee or manager, or similar, of a local store environment 120 where the appliance 101 is operated in order to execute recipes 260 for foodstuffs. In this example, the recipe processing app 202 receives a particular recipe 260 (as shown on the UI 105 as a Wild Berry Smoothie recipe 260A) and communicates with the appliance 101 and/or its integrated components of the scale 104 and the blender 108 through network 145. Before the blender processing state depicted in FIG. 1, a user 124 has added ingredients 416 to a container 106. An appliance 101 connection status indicator (not shown) may signal whether a communication has been established between the appliance 101 and the recipe processing app 202. Appliance 101 may incorporate a control panel 122 shown in the right column of appliance 101 for performing functions of the appliance 101. The FIG. 1 display options on the UI 105 may include at least one instruction to operate the appliance 101 for processing the recipe 260A. The instruction may be shown in a recipe action block 150. The subject action shown in a recipe action block 150 occurs after ingredients 416 for the recipe 260A have been added to the container 106, and the container 106 has been moved to the blender 108 portion of the appliance 101. In addition, as the instruction involves a blending operation, the recipe action block may 150 also be referred to as a recipe blend block 150. Within the recipe blend block 150 are narrative instructions as follows: "secure lid and blend until smooth," "running program" and a "GO" button 190. The GO button 190 also is included on a control panel 122 of the appliance 101. This is shown based on the GO button 190 of the control panel 122 presented in FIG. 1 in enlarged form with a dotted line association to the control panel 122, for illustration purposes. The FIG. 1 depiction shows a user 124 activating the GO button 190 on the control panel 122. As a result of the user 124 interaction, the recipe action block 150 shows "running program" and, on the right side of the UI 105, there is an additional narrative description of the pending status of "blending in progress." The UI 105 also shows an additional recipe action block 150 presenting an action of serving the foodstuff.

The FIG. 1 UI 105 representation also depicts the blender 108 in a status of processing or blending the recipe 260A ingredients 416. The blender 108 status, as discussed above, also is reflected in at least two representations within the recipe blender block 150, namely the blender program graph 170A and the blender program circular dynamic icon 180. The graph 170A may dynamically adjust to present a shaded portion (or other change to the visual appearance) relative to the x-axis as a representation of time elapsed during processing as well as a comparison between the time elapsed and the total duration for processing. In addition, the circular dynamic icon 180 further may indicate the status of processing the recipe 260A. For example, the rotational feature may dynamically rotate during processing by the blender 108 and/or the portions of concentric circles may change as a function of a percentage of 80%, 90% or 100% et al. as may be appropriate for each characteristic. The FIG. 1 circular dynamic icon 180 shows 100% for each of speed and power.

While in this FIG. 1 example, the blending operation is automated based on the recipe processing app 202 transmitting appliance data 430 to the appliance 101; there also is a manual step of a user 124 activating a GO button 190 to start the blender 108 processing. The "GO" button also may be shown for guidance purposes on the recipe blend block 150 as well. In alternative examples, the "GO" button 190 on the recipe blend block 150 may be operable to receive data entry in order to initiate the blender 108. In still further examples, the "GO" button 190 on the recipe blend block 150 may be operable to receive data entry while the control panel 122 may be inoperable. In this manner, all operations of the appliance 101 may be controlled solely through the UI 105. In other examples, the blender 108 of the appliance 101 may instead detect the insertion of the container 106 on the blender 108. The detection may then be the basis for initiation of the blending process without any user 124 data entry. This is shown and further described regarding FIGS. 8A-8B. In yet further examples, the user 124 may interact with the control panel 122 in order to enter data associated with the recipe 260A, or in effect to create a blender program through manual input, as shown and further described regarding FIG. 7A. The recipe processing app 202 in this example then presents data associated with and/or feedback about the appliance 101 processing on the UI 105 of the device 102, as also shown and described regarding FIG. 7B. These examples demonstrate the scope of supporting the automated operation of the blender in part or in whole and the presentation of data associated with and/or feedback about the appliance 101 on the UI 105. The automation and feedback enable the recipe processing app 202 to support the execution of the recipe 260A with improved quality.

FIG. 2 is a schematic diagram of an illustrative computing environment 200 including the Perfect SmartRecipe™ Software-as-a-Service (SaaS) Platform 210 (hereinafter referred as "platform" 210) usable to provide a recipe 260 for use in a local store (such as, the local store environment 120 as also shown in FIG. 1). The platform 210 supports communications with a recipe processing app 202 for the preparation of foodstuffs with one or more of a variety of appliances 266, such as a combination scale and blender appliance 101, a blender 208 or a combination of separate appliances of a scale 204 and a blender 208 which interact for the purpose of identifying a container 106, or similar. Each recipe 260 may include two or more ingredients (as shown in FIG. 4 as 416) and at least one of appliance data 266 or one or more actions 262 undertaken to prepare a foodstuff. The platform 210 is commercially available from the Perfect Company, Inc. (hereinafter referred to as the "Perfect Company").

The platform 210 may communicate with one or more appliance(s) 266 through a communication connection 230. Each of the appliances 266, such as 101 (including 208 and/or 204), 208 and 204, or similar, may include a recipe processing app 202 installed on a computing device. Examples of computing devices 102 are as follows: the device 102 for the appliance 101, a component 222 of the blender 208 or a device 102 or 252 associated with the blender 208, a component 222 of either of the scale 204 or the blender 208 or one or more devices 102 or 252 associated with the scale 204 and/or the blender 208, or similar. Computing devices may include one or more of the following: a mobile device such as a tablet 102, a mobile phone 252, desktop computer, laptop computer, handheld computer, computing platform, netbook, smartphone, and other computing platforms. Computing devices may be integral to appliances 266, as shown in FIG. 2 as 222 associated with the blender 208, or the scale 204 associated with the blender 208, or may include a mobile phone 252 or tablet 102 associated with any of the appliances 266, such as 101 (including 208 and/or 204), 204 or 208, or similar. In addition, FIG. 2 shows that the tablet 102 is associated with the combination scale and blender appliance 101 and is in communication with the appliance 101 using a network (as shown in FIG. 1 as network 145). A computing device 102 or 252 may similarly be associated with the other appliances 204 or 208 and may replace the computing device 222 (shown for appliances 204 and 208). The computing device 102 or 252 also may mirror or present a portion of the control panel as part of the computing device 222 on a user interface (UI) of the device 102 or 252 (shown in FIG. 1 as UI 105).

Mobile or other devices supporting the recipe processing app 202 may be operated in a variety of different operating systems such as iOS, Android, or Windows Mobile, to name a few examples. Web platforms (not shown) supporting recipe processing app 202 may be operated in a variety of different operating systems such as Microsoft Windows, Apple OS X, Linux, Chrome, Firefox, or Safari, to name a few examples. A variety of operating systems, including hardware and/or software components supporting the recipe processing app 202, or other computer applications or technology platforms or environments in which the recipe processing app 202 are used are within the scope of the instant claims and invention.

The platform 210 may also support interactions with a local store environment 120, where appliances 266, such as an appliance 101, a blender 208 and/or a scale 204 may be operated. For example, one or more server(s) at the local store environment 120 may receive recipes distributed by the platform 210 from a central source environment 242. FIG. 2 further illustrates, in the central source environment 242, a computing device shown as a computer operated by a user 236 (for example, a corporate manager or another employee, or similar). The user 236 may interact with a distribution application 244. In this example, the user 236 may use the distribution application 244 to select recipes 260 for distribution from the central source environment 242 via communication interface 232 through platform 210 to one or more local store environments 120, in which appliances 266, such as 101, 208 and/or 204 may be used to create foodstuffs.

The platform 210 may support additional interactions with the central source environment 242. Interactions may include the user 236 to process and finalize recipes 260 for distribution through the platform 210. In another example, one or more recipes 260 may be developed and launched for distribution to other technology environments supporting the preparation of foodstuffs through platform 210 (not shown), as well as the local store environment 120. By utilizing the platform 210, recipe processing may be distributed to one or more platform server(s) so the data processing, collection, sorting, filtering, analysis, and storage associated with the recipes may be more effectively managed. The impact may be an overall reduction in processing loads at any one server associated with recipe processing. More particularly, the platform 210 may provide an additional advantage that a portion of the full processing of any hardware, software and/or a combination of hardware and software components or portions of the processing, such as the creation, distribution, processing and feedback regarding recipes, and/or other processes that are computationally intensive, may be performed on a variety of hardware and/or software resources. Since the platform 210 may support portions of processing in a distributed network approach, computationally intensive processing need not be executed entirely on the local store environment 120 or by the server(s) and processor(s) associated with the web platform or other environments in which the recipe is prepared, but portions of the processing may perform on one of the platform 210 servers as well as other servers, such as the central source environment 242 server(s). Portions of the processing may also be distributed to applications or servers with portions or all the processing components being remote from each other. In addition, processing loads may be distributed across several computational environments, including the platform 210 and/or the local store environment 120 server(s) that may run the systems and methods for processing recipes. Processing loads may also be distributed to other servers that run the platform 210, either independently, or in conjunction with the local store server(s). In this example, the application processing load on the local store environment 120 may be reduced, particularly as to processing feedback that may trigger an update to recipes. A portion or all of this processing may occur through the platform 210 at the server(s) remote from the local store environment 120, thereby providing greater capacity at server resources at the local store environment 120. In other examples, the source of the recipes 260 to the local environment 120 may be from data stored locally (such as, as shown in FIG. 3, local electronic storage) or other technology environments (not shown).

The platform 210 may also perform various other tasks such as, in this example, communicating with one or more databases to store, access and output the content and activities for processing recipes and providing feedback for the platform 210. For example, the platform 210 may store and retrieve data from one or more databases comprising recipes 260, actions 262, containers 264, appliances 266 and feedback 268. One or more platform server(s) 214 may support this processing. The platform 210 also may execute data analytics processing and receive data, including selections and other input, entered by users of the applications computing devices 102, 222 or 252. The platform 210 may process received data to provide feedback for such computing devices 102, 222 or 252 or to provide portions of feedback for transmission to the central source environment 242 for use, for example, by the user 236 to inform decisions about the distribution of recipes 260.

While the platform servers 214 are shown for illustrative purposes in FIG. 2, the processing may be implemented in several environments. Thus the use of platform server(s) 214 is optional. More particularly, a processing environment used to develop a recipe 260 for use in a local store, distribute the recipe 260, and receive and process feedback from recipe 260 execution may vary depending upon the desired implementation of these processes. For example, such processing may occur in any number of environments, such as a cloud environment (shown as platform 210), servers in addition to the server(s) 214, or another processing environment. As one example of recipe distribution, files containing recipe(s) 260 and other data and related components and/or data associated with the recipes 260 or processing of the recipes 260 may be served by a platform server 214 and received at a local browser of a computing device operating any of appliances 266, such as 101, 208 and/or 204.

Figure 3:
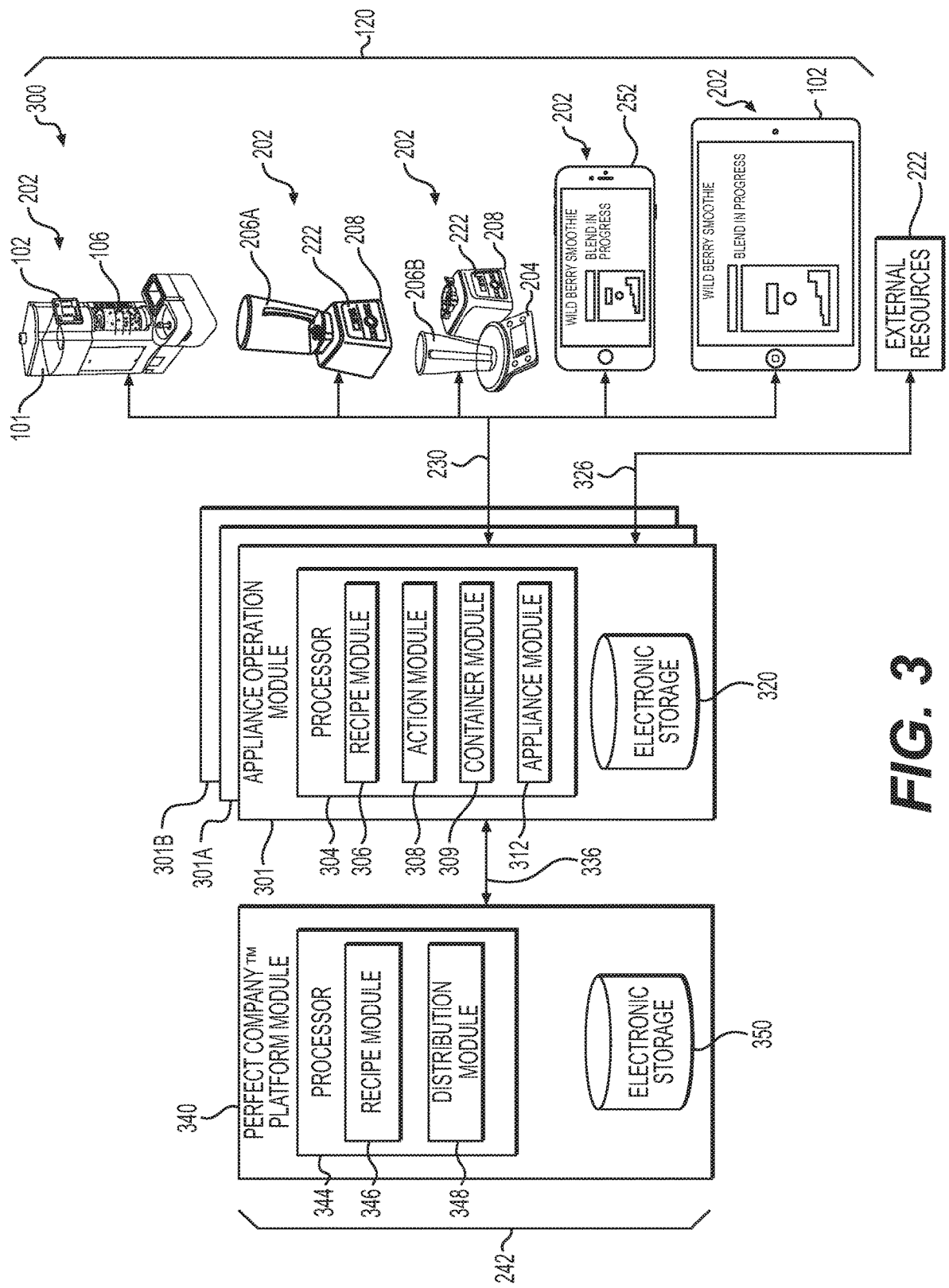
FIG. 3 is a schematic diagram of an illustrative computing environment showing components that communicate to enable various operations involving computing modules and for a local store environment and a central source environment.

FIG. 3 is a schematic diagram of an illustrative computing environment 300 showing components that communicate to enable various operations involving computing modules 301 and 340 for a local store environment 120 and a central source environment 242. The systems and methods of the computing environment 300 provide for various functionalities, operations, or actions involving one or more computing modules 301, 301A, 301B for the local store environment 120, to receive, process and provide feedback for recipes 260. The systems and methods also provide for computing module 340 for the central source environment 242, to prepare and distribute the recipes 260.

The computing module 301, titled "Appliance Operation Module," may be implemented in the recipe processing app 202, installed on one or more computing devices 222, 102 (a tablet), 252 (a mobile phone), or similar. Alternatively, computing module 301 may be implemented on another device or platform. The module 301 may represent a single local store environment 120, and the systems and methods may further include distribution of recipes 260 to multiple local store environments 120, shown as modules 301, 301A, 301B, et al. In this example, each additional module 301A and/or 301B may include the same components as shown in module 301. In other examples, different modules 301A and/or 301B may include different components than module 301. Module 301 may include at least a processor 304. The processor 304 may further include the following: a recipe module 306 for processing recipes 260, including in some examples processing data associated with a recipe 260 as a source of an appliance program 434; an action module 308 for processing instructions, steps or other activities associated with the recipes 260, including operations of an appliance 266 (such as 101, 208 and/or 204); a container module 309 for processing data associated with a container 106 as a source of an appliance program 434; an appliance module 312 for processing the identification and/or operation of one or more appliances, including in some examples processing data associated with an appliance 266 (such as 101, 208 and/or 204) as a source of an appliance program 434; and, a feedback module 314 for processing feedback for use by the processor 304 and/or for transmission to module 340 in order to be used by the platform 210. For example, the local store environment 120 may provide updates to appliance operations or operating code that may be beneficial to transmit back to the central source environment 242.

A recipe module 306 may contain or access recipe data. The recipe data 260 may include and/or access appliance data 430, such as including operating code 435, associated with the recipe 260. The recipe data 206 alternatively or in combination may include or access one or more actions 262 for the operation of any of appliances 266 (such as 101, 208 and/or 204) In this way, a portion of the appliance operation(s) or the full appliance operation(s) may be automated. Alternatively, a recipe processing app 202 may retrieve recipe data from a persistent memory on a computing device 102, 222 or 252. A recipe processing app 202 implementing computing module 301 may retrieve recipe data 260 through recipe module 306. As a further alternative, a recipe processing app 202 may retrieve recipe data from another recipe service (not shown). A recipe service may be a public, commercial, or private recipe repository, and retrieval may be free or may require a subscription or usage payment for access. A recipe service may be private to a user, may be shared among a specific group of users, or may be shared among all users of a recipe processing app 202. As a further alternative, a recipe processing app 202 may retrieve recipe data from another computing device via a network 145 (shown in FIG. 1). As yet a further alternative, a recipe processing app 202 may retrieve data by decoding an indicium on an ingredient carton or package.

As another alternative, a recipe processing app 202 may retrieve recipe data including operating code 435 and/or actions 262 to operate an appliance. The data may be represented by the appliance program 434 to operate the appliance 266. However, the operating code 435 and/or actions 262 may be generated or accessed based on additional appliance programs from one or more of the recipe 260, the appliance 266 and/or the container 264. For example, the appliance program 434 may be used as part of or as associated with the recipe 260 or may be combined with an appliance program provided as part of the recipe data 260 or from another source (such as a container 106 identification) in order to generate an aggregate or composite appliance program. In providing the user 124 with input regarding the operating code 435 and/or actions 262, the recipe processing app 202 may provide the user 124 with an option of selecting the representation of this appliance data 430. The selection may be based on an appliance program 434 from one or a combination of multiple sources, such as a recipe 260, a container 264 and/or an appliance 101, 208 and/or 204. A selection option is shown and further described regarding FIGS. 11A-11C.

An action module 308 may process the actions that may be included in the recipe 260, as processed by the recipe module 306. For example, after adding ingredients to a container in which they will be processed, actions may be detailed in instructions regarding processing, such as mixing, blending, frying, sautéing, baking, or similar. The processing may include one or more appliances 266. In one example, a recipe may include two or more ingredients 416 and at least one of appliance data 430 or one or more actions 262 undertaken to prepare a foodstuff. The appliance data 430 may indicate at least a portion of operating code 435 to operate an appliance 266. An action 262 may include transmitting the portion of the operating code 435 to the appliance 266. In a further example, the portion of the operating code 435 may include one or more appliance operations 436 upon which an appliance 266 is operated. In an alternative example, the recipe 260 may include two or more ingredients 416 and at least one action 262, where the action is an appliance operation 436. An example of an appliance operation 436 is a process by which the recipe ingredients are processed, such as blending, mixing, frying, sautéing, or similar. The appliance operation may also include the speed, power, duration and/or other operating parameters associated with the operation of the appliance 266.

More generally, actions 262 associated with the recipe 260 in addition to operating the appliance 266 may include the following: identify a container in which to place one or more ingredients; place the container on a scale, set the container aside; replace the container with another container; place one or more ingredients in a separate container; combine ingredients in separate containers; irreversibly mix ingredients together; physically alter one or a combination of ingredients through a process such as blending, sautéing, baking, or the like; mingle ingredients or sets of ingredients without admixture; place the container in an appliance; operate the appliance; enter one or more pieces of data to operate the appliance; take one or more actions to initiate operation of one or more appliances; monitor or change the operation of one or more appliance(s); perform a quality check of the foodstuff; remove the foodstuff from the appliance; place the foodstuff in a serving container; measure one or more properties of the foodstuff for another quality check; or similar. A recipe step may comprise manipulating a device preparatory to a further recipe step, for example, preheating an oven preparatory to baking an assemblage of recipe ingredients. A recipe step may comprise utilizing a device to perform an action upon one or more ingredients, such as baking a cake mix The appliance module 312 may include processing in order to identify an appliance 266, as well as operating code and/or other processing approaches to operate the appliance. Appliance(s)266 related to a recipe 260 supported by the recipe module 306 may or may not be identified in the recipe 260 as provided to the module 301. In one example, the appliance 266 may be identified based on module 301 of recipe processing app 202 detecting an appliance available within the environment 120, such as through the network 145. The appliance module 312 may operate appliances 266 based on the operating code 435 and/or actions 262 to provide for appliance operation(s) 436. The recipe processing app 202 may support additional identification or generation of appliance data 430 and/or actions 262 based on the representation of an appliance program 434. The source of the appliance program 434 may be from one or more of a recipe 260, a container 264 and/or the appliance itself 101, 208 and/or 204.

The module 301 may further include an electronic storage 320. The module 301 may engage in two-way or one-way communications with the computing devices 102, 222 or 252, associated with one of the appliances 266 (such as appliance 101, the blender 208 and/or the smart scale 204) using a communication connection 230. The module 301 may also communicate with external resources 322 using a communication connection 326. Module 301 may also communicate with computing module 340 using a communication connection 336.

The computing module 340, titled the "Perfect Company™ Platform Module," may be implemented using one or more applications at a central source environment 242, or may be implemented on one or more discrete platforms or devices. Module 340 may include processing to create, modify or distribute one or more recipes 260 to a module 301 using a communication connection 336. Module 340 may include at least a processor 344. The processor 344 may further include a recipe module 346 for creating and/or modifying recipes 260, including in some examples appliance data and/or actions, and a distribution module 348 for processing the distribution of recipes 260 to one or more modules 301, 301A, 301B, et al. Module 340 may further include an electronic storage 350. The communication connections 230, 326 and 336 may be wired or wireless and may be one-way or two-way.

The computing modules 301 and 340 may further include one or more algorithms, software, a component of a software, or a database that performs, or is involved in the performance of, one or more operations including calculating values, retrieving data, storing data, editing a file, deleting files, transmitting data or instructions, receiving data or instructions, displaying various types of information or data, processing data, and allowing communication between two or more devices, servers, or networks.

The local source environment 120 computing devices 102, 222 or 252 also include a recipe processing app 202. The recipe processing app 202 may be configured to transmit or receive essentially real-time information to or from an appliance 266 (such as 101, 208 and/or 204). In another example, portions of the recipe processing app 202 operation may occur in multiple computing devices 102, 222 or 252. The recipe processing app 202 may access information relating to recipes, ingredients, appliance data, actions, appliance programs, or similar. The recipe processing app 202 may further access information relating to feedback based on the actual operation of the appliance 101, 208 and/or 204 after the operation is completed.

The recipe processing app 202 may access information from local, external, and/or online databases, including metadata for recipes, containers and/or appliances. The recipe processing app 202 may also present a user with a UI (as shown in FIGS. 1, 6A-6B, 7A-7B, 8A-8B, 9A-9C, 10 and 11A-11C) that provides menus and menu options. The UI may also provide approaches for entering, searching, storing, and identifying user inputs, information, and data. Such user inputs, information and data may include actions to be performed; processing of one or more appliances based on appliance programs; adjustments to one or more appliance programs based on feedback from the execution of the appliance programs and/or manual changes to the one or more portions of automated operations; or similar. The recipe processing app 202 may be configured to receive commands or instructions via various methods for user inputs such as using a touchscreen display, keypad, keyboard, voice commands, visual commands, and similar. For example, the appliance 101, the blender 208 or the smart scale 204 may have a button pad that allows transmission of instructions or commands to the recipe processing app 202, or vice versa.

Figure 11A:
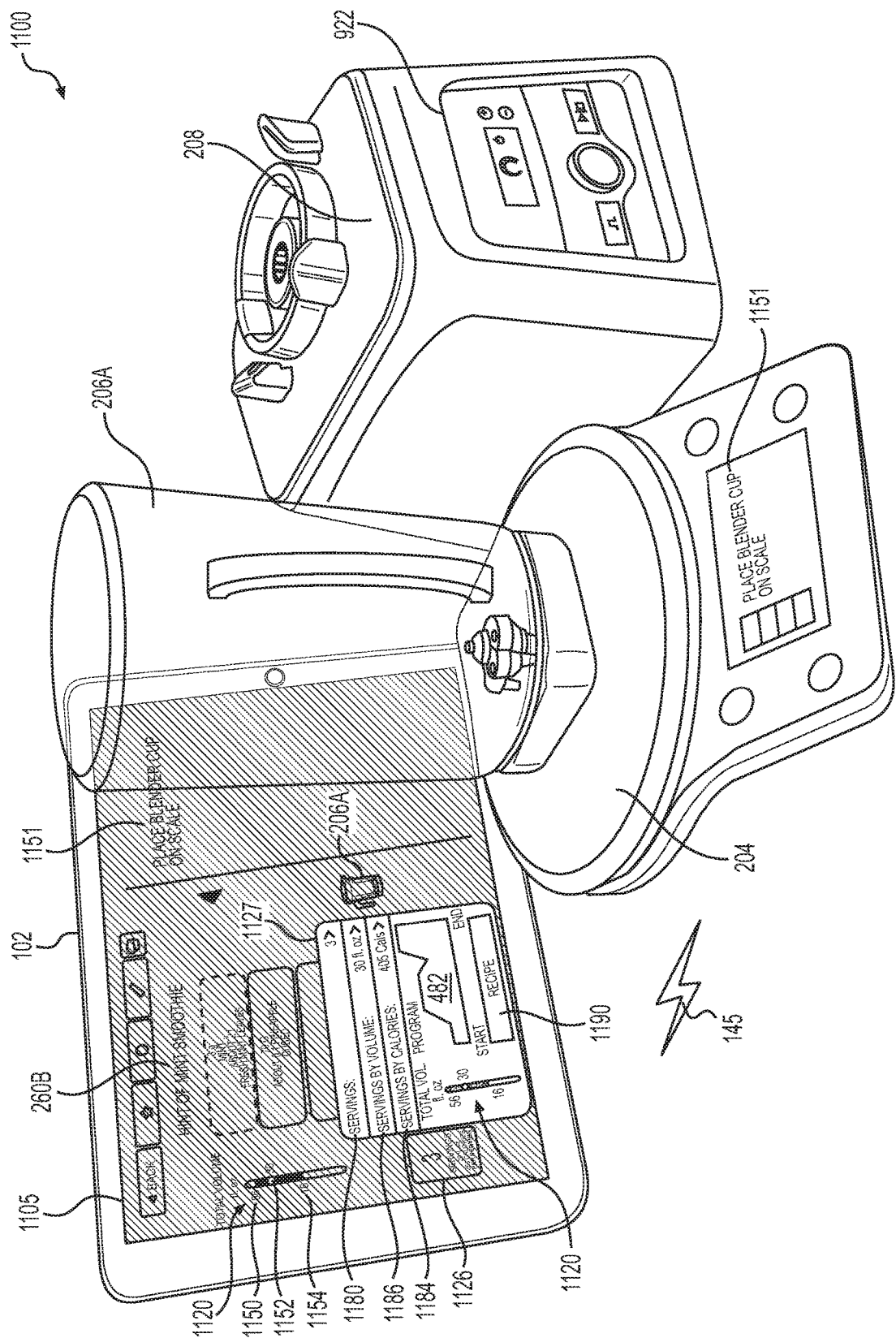
FIGS. 11A-11C depict schematic diagrams of an illustrative example of systems and methods based on one or more appliances and including a recipe processing app providing an exemplary display option with serving size and volume data for the recipe and feedback for the operation of the appliance(s).
Figure 11B:
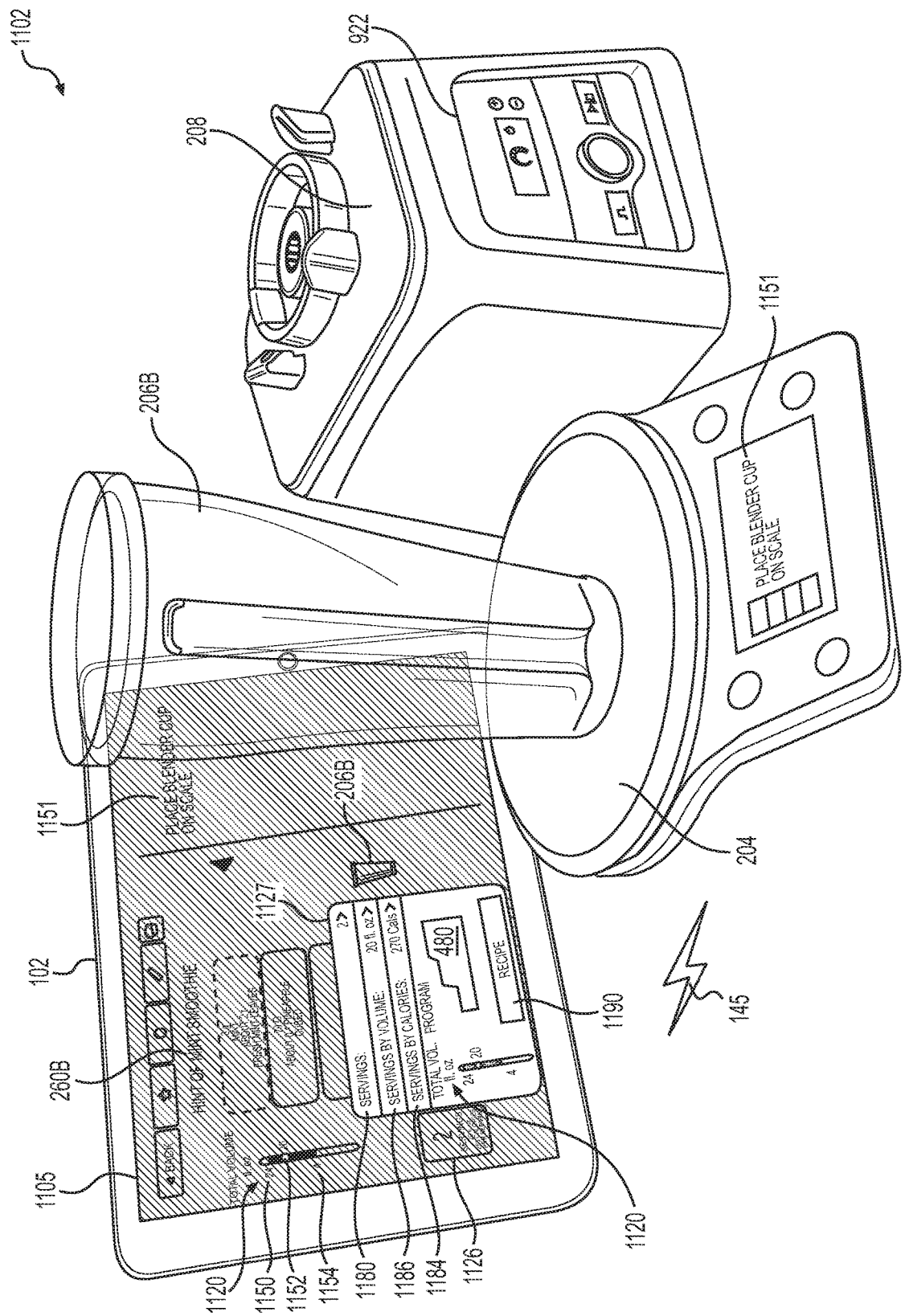
Figure 11C:
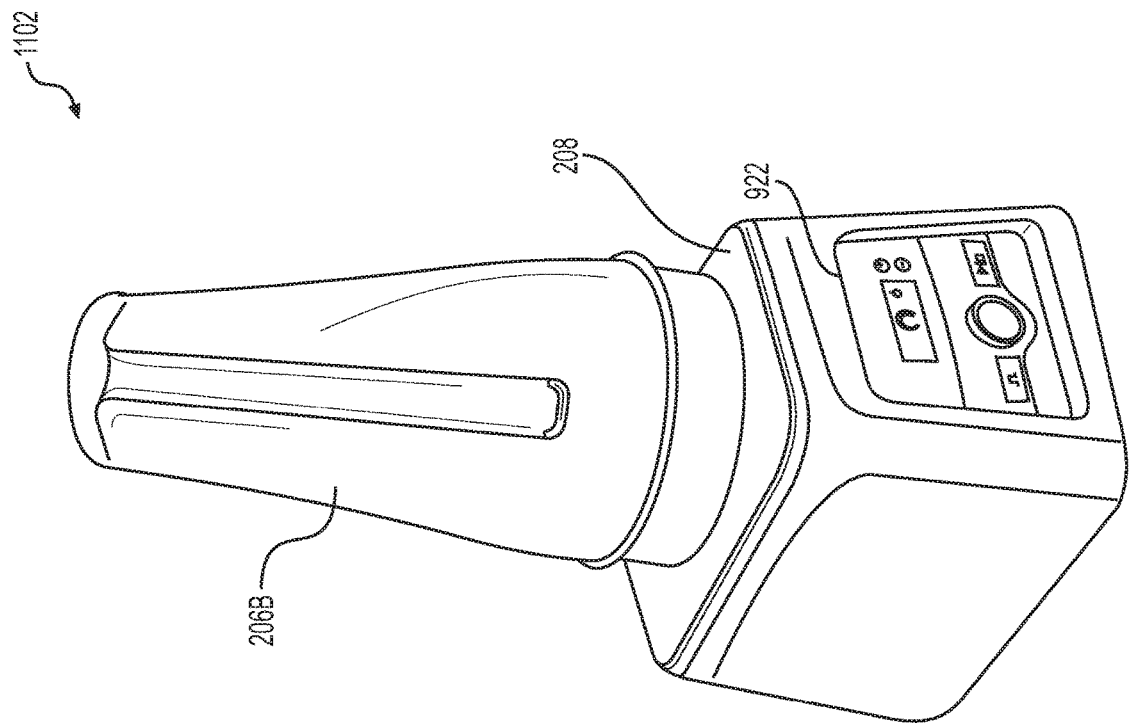
Figure 11C:
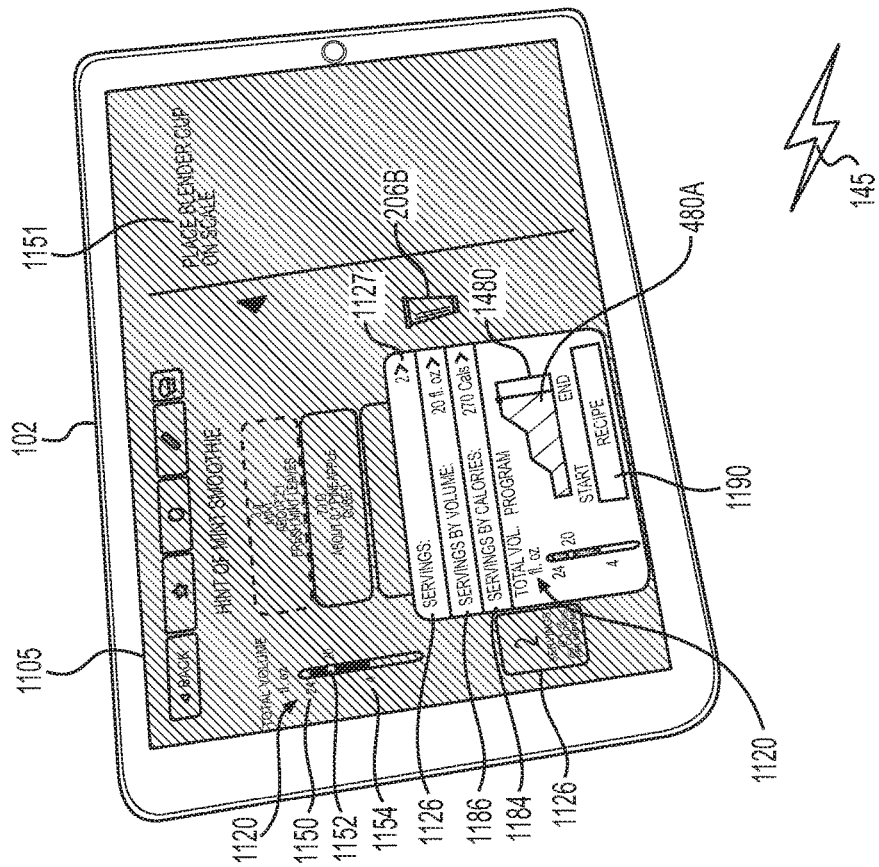

The recipe processing app 202 may further be configured to assist the user by displaying one or more indications of actions on the UI of one or more appliances 266 (such as 101, 208 and/or 204). The actions may be in the form of instructions to operate the appliances and/or representations of the appliance operation, including the graph 170A and the dynamic circular icon 180 shown in FIG. 1. The display of actions on the UI also may include a presentation of data detected about a container 106 or an appliance 266. For example, when a container 264 is detected by the scale and the identification is received by the recipe processing app 202, metadata regarding the container 264 may be displayed. The metadata may include specifications for the container 264, as well as an appliance program 434 specific to the container 264. The display of actions on the UI further may include a data entry options to provide user input to the recipe processing app 202. One example of data entry on the UI (as shown in FIGS. 11A-11C as UI 1105) is a selection of an appliance program 434 associated with a recipe, shown as a recipe selection button 1190, as an alternative to an appliance program associated with a recipe 431 based on the detection of a container 264 (such as container 206A or 206B). More particularly, in FIG. 11A, a blender program 482 (as described further regarding FIG. 4B below) is shown in the UI 1105 and the recipe selection button 1190 is provided. The display on the UI 1105 may further be operable to enable a user 124 to select based on activating the recipe button 1190 an appliance program associated with the recipe 260 to enable a user to select a blender program associated with the recipe 260 (or an appliance program based on a recipe 431) rather than to continue with the blender program 482 associated with the detected container 264.

The appliance 266 (such as 101, blender 208 and/or smart scale 204) and their associated computing device 102, 222 or 252, may have one or more processors configured to execute various functions, operations, commands, functionalities, processes, and computer modules. In other examples, the system 300 may utilize other devices or platforms for executing various functions, including, for example, receiving data from The appliance 101, blender 208 and/or smart scale 204 and processing the data to provide for the next operation of the appliance 101, 208 and/or 204. The appliances 266 (such as 101, 208 and/or 204) also may include processors remotely accessible through platform 210. In another example, the appliances 101, 208 and/or 204 further may include a portion or all the processing capabilities, or the processing may occur on a distributed network with portions or full processing implemented in one or more server(s), which are distributed within a network between remote devices. One example of a communications channel is shown in FIG. 1 as a network 145.

The appliances 266 (such as 101, 208 and/or 204) may further include notification or feedback systems in the form of optical and audio signals or alerts that may be used to assist the user when performing an operation. Audio or visual prompts for the user may be activated from a computing device 102, 222 or 252, or an appliance 101, 208 and/or 204. For example, a recipe processing app 202 may talk a user through operation of the appliances 101, 208 and/or 204. It may also provide incremental audio notices during a sequence of appliance operations. For example, during a blending operation, one of an audio tone, length or level may indicate a slow blend speed while a different audio tone, length or level may indicate a different blend speed, or the tone and/or level may change as the blending operation is close to completion.

A computing device 102, 222 or 252 may be configured to allow a user to access and interact with any components of the system via a recipe processing app 202 (shown in FIG. 2) installed on the computing device 102, 222 or 252. A computing device 102, 222 or 252 may also include a UI (as shown in FIGS. 1, 6A-6B, 7A-7B, 8A-8B, 9A-9C, 10 and 11A-11C), one or more processors, electronic storage, and other components. A computing device 102, 222 or 252 may further include one or more of the following: a desktop computer, laptop computer, handheld computer, tablet computing platform, netbook, smartphone, and other computing platforms. A computing device 102, 222 or 252 may send commands to or receive requests or prompts from the appliances 266 (such as 101, 208 and/or 204). In addition, a UI (as shown in FIG. 1 as UI 105) on a computing device 102, 222 or 252 and/or appliances 101, 208 and/or 204 may show various types of information in approximately real-time, such as instructions for operating appliances 101, 208 and/or 204 and one or more indications associated with one or more data fields or other data of control panels of the appliances 101, 208 and/or 204. In one example, a recipe processing app 202 may include at least one display integrated with appliances 101, 208 and/or 204 or at least one UI display that forms part of a computing device 102 or 252. Appliances 101, 208 and/or 204 may also show approximately real-time information that includes the connection status with a computing device external to the appliances, such as 102 or 252.

A UI 105 may also be configured to provide interface functionality to a user and at least one computing device 102, 222 or 252 through which the user 124 may provide information to and receive information from the system. This enables data, user comments, feedbacks, alerts, results, queries, instructions, or similar, herein collectively referred to as "information," to be exchanged between the user and the computing device 102, 222 or 252. In addition, where there is interaction with the platform 210 after the operation of the appliances 101, 208 and/or 204, the information may be further exchanged between the module 301 and a platform 210. Examples of UI 105 hardware and/or software components include a touch screen, keypad, touch sensitive and physical buttons, switches, keyboard, knobs, levers, display, speakers, microphone, indicator light, audible alarm, printer, and other interface devices. In some system implementations, the UI 105 includes a plurality of separate interfaces. The UI 105 may include at least one interface integrated with the computing device 102, 222 or 252. In further examples, a UI 105 may refer to software, hardware, a combination of hardware and software, or a device the primary function of which is to allow communications or interactions between two or more devices or between a user or plurality of users and one or more devices. A UI 105 may be configured such that a user may navigate through electronic folders, databases, servers, networks, and various local or external storage media to locate, view, select, or store the desired recipe. In addition, data provided to the user via one or more formats (such as, one or more indications on a user interface, including a first indication, a second indication, a third indication, a fourth indication, a fifth indication et al.) may be presented as one or more of text, alphanumeric characters, graphics, scale, charts, visual indications, audio indications, video indications or other depictions.

The computing architecture as shown, for example, in FIGS. 1-3 may include one or more processors and one or more computer-readable media that store various modules, applications, programs, or other data. The computer-readable media may include instructions that, when executed by one or more processors, cause the processors to perform the operations described herein. The one or more processors may include any suitable type of processor including, without limitation, central processing units or graphics processing units.

Implementations also may be provided as a computer program product including a non-transitory machine-readable storage medium having stored instructions thereon (in compressed or uncompressed form) that may be used to program a computer (or another electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, examples may also be provided as a computer program product including a non-transitory or transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. Also, system memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which may be used to store the desired information and which may be accessed by the carrier servers.

Figure 4A:
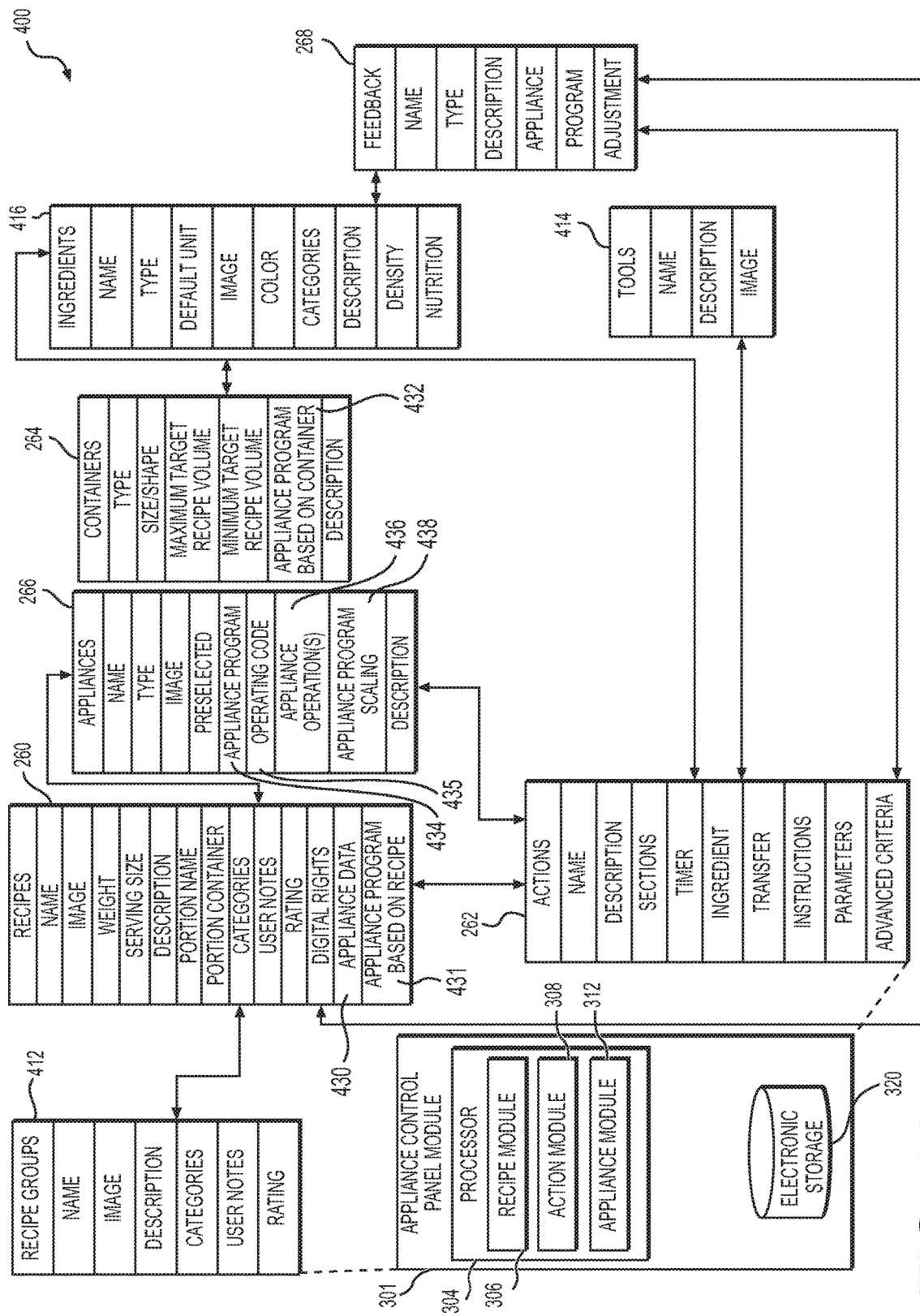

FIG. 4A is an illustrative data structure 400 showing data sets and data flows among various data sets associated with the systems and methods for processing and providing feedback for recipes 260 using recipe processing app 202, including distributing recipes 260 through the platform 210 which include appliance data 430 and/or actions 262 to support the operation of appliances 266. Processing of a specific combination of data and information may be triggered by a user (including a user 124, such as an employee in a local store environment 120, or another user 236 in a central source environment 242, or similar) as a result of a command, user input, recipe-prescribed user action, or user selection from a recipe processing app 202 or recipe distribution app 244 of a menu or data selection option via a user interface (UI) 105 (shown in FIGS. 1, 6A-6B, 7A-7B, 8A-8B, 9A-9C, 10 and 11A-11C) or interfaces on appliances 266 (as discussed further regarding FIGS. 9A-9C, 10 and 11A-11C). Processing may be triggered alternatively or additionally by one or more signals detected by one or more system sensors. The data and processing may be supported by the module 301.

The various datasets include the recipe 260 data, the action 262 data, the container 264 data, the appliance 266 data, the feedback 268 data, the recipe group 412 data, the tool 414 data and the ingredient 416 data. The data sets 260, 262, 266, 268, 412, 414 and 416 show various data and information such as recipes 260, appliance data 430, operating code 435, appliance program 434, appliance program based on a recipe 431, appliance program scaling 436 and an appliance program based on a container 432. In addition, one or more data sets may also include the following fields: name, type, image, operations, maximum target recipe volume, minimum target recipe volume, description, categories, user notes, rating, digital rights, portion name, portion container, serving size, color, default unit, density, nutrition, sections, timer, transfer, instructions, update, adjustment and parameters. The data sets may be stored in the same or different electronic storage media, such as for example electronic storage 320.

The recipe 260 data may communicate and access each of the ingredient 416 data, the action 262 data, the container data 264, the appliance data 266, the recipe group 412 data, the feedback 268 data and the tool 414 data. Each of the data sets 260, 262, 264, 266, 268, 412, 414 and 416 also includes specific data. For example, for the appliance data 266, in addition to the basic data of the name, type, image, preselected and description, the data set 266 may include: an appliance program 434, operating code 435, appliance operation(s) 436 and an appliance program scaling 438. The appliance program 434 may be the representation of the operation of the appliance 266 based on the operating code 435 or appliance operation(s) 436. The appliance program scaling may adjust the appliance 266 operations based on the size or volume of the recipe 260. This may, in turn, impact the presentation on a user interface (UI) such as the FIG. 1 UI 105 of the appliance program graph 170A based on a change in operating parameters of processing the recipe 260.

Recipe 260 data may comprise a name, image, weight, serving size, description, portion name, portion container, categories, user notes, rating, digital rights, or similar. More particularly, the recipe 260 metadata may also include appliance data 430, or one or more of operating code 435 or actions 262 in the form of appliance operation(s) 436 to operate an appliance 266. The operating code 435 and/or appliance operation(s) 436 are shown in this FIG. 4A under appliance 266 dataset. However, they may alternatively be stored in the recipe 260 dataset or be stored as part of the appliance data 430 as presently shown in FIG. 4A. In addition, the appliance data 430 may indicate at least a portion of operating code 432 to operate an appliance. Action 262 data may comprise a name, a description, sections, a timer, an ingredient, a transfer, instructions, parameters, advanced criteria or similar. More particularly, the action 262 metadata may include one or more appliance operation(s) 436, which also is shown as being stored in this FIG. 4A example as part of the appliance 262 dataset. Container data 264 may comprise a type, a size/shape, a maximum target recipe volume, a description, a minimum target recipe volume, as well as an appliance program based on container 438.

In addition, the recipe metadata may further include one or more of each of the various appliance programs 434, 431 and/or 432 associated with the recipe 260, container 264 and/or appliance 266 (while in this FIG. 4A example, each program 434, 431 and 432 is shown in a different dataset). An appliance program 434 for the operation of an identified appliance also may be detected by the recipe processing app 202. As a yet further example, recipe metadata may specify particular operating parameters, such as speed, power and/or a duration of blending, to be utilized with a given size and shape of a blending container. As a yet further example, recipe metadata may specify a specific sequence of recipe ingredient steps and/or appliance operations for a given size and shape of a blending container. Recipe metadata may yet further comprise metadata specifying limitations or exceptions to be applied to the selection of one or more serving sizes for the recipe, including limitations on particular serving sizes as a function of an appliance used to process the recipe. For example, recipe metadata may specify a minimum, an optimal, and a maximum serving size for a recipe. As a further example, recipe metadata may specify a minimum, an optimal, and a maximum weight for a recipe.

The data sets and their specific data may be transmitted to or shared with other data sets to allow the processing of various data and to generate output information for the computing modules 301 and 340. Examples of output information are a message, alert, notification, feedback, update, or the result of a calculation associated with an individual ingredient or a combination of ingredients, as well as the outcome of an action. The generation of output information may be triggered by an event. For example, an event trigger may cause output information to be generated following an error in the operation of an appliance 266. An error may then be generated and a notification provided, for example on display UI 105 reflecting the error (not shown).

Figure 4B:
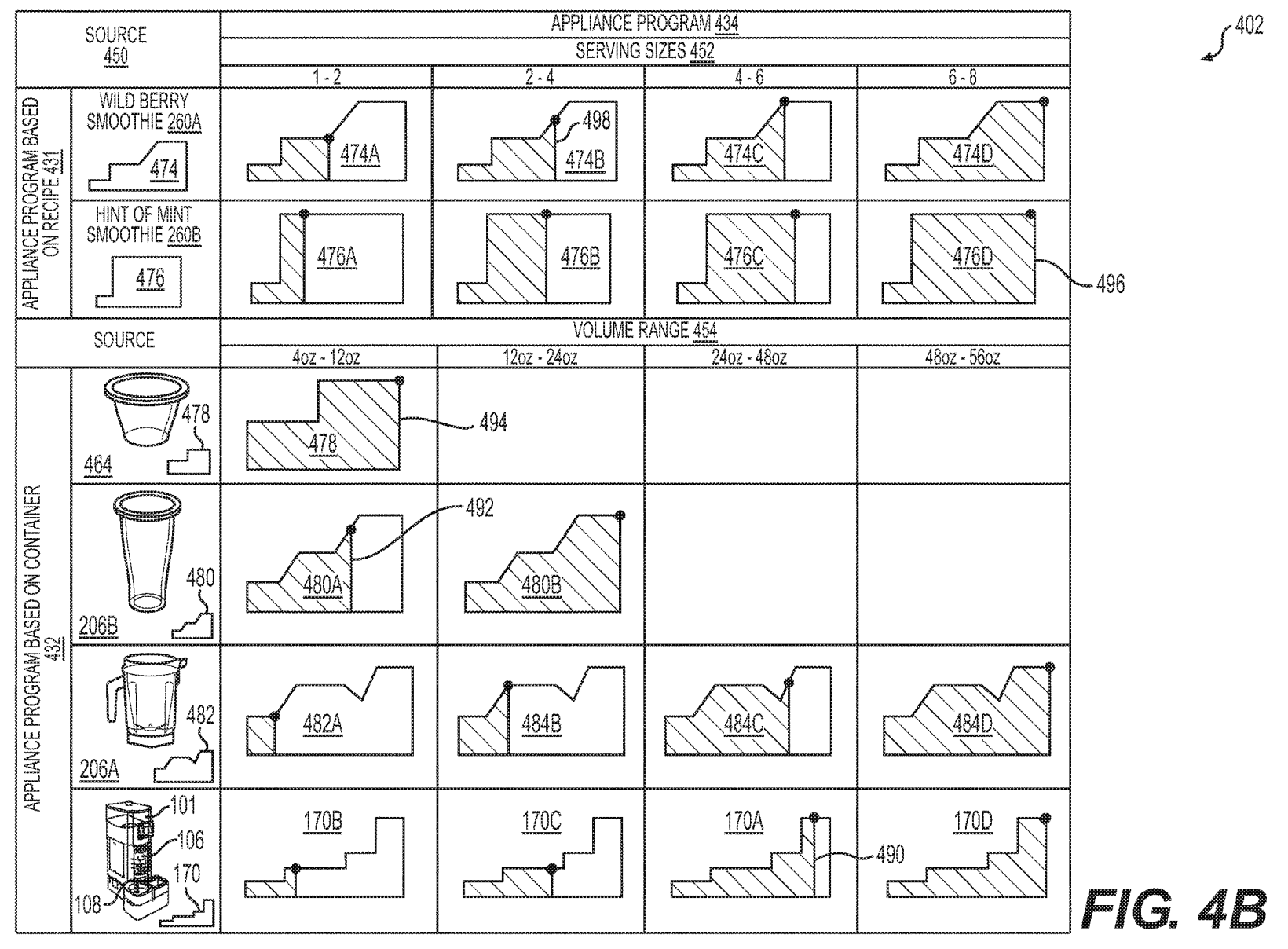

The appliance program 434 represented on the UI 105 in the form of a graph, such as graph 170A as shown in FIG. 1, is now further described. FIG. 4B is an illustrative data structure 402 in the form of a table showing exemplary appliance programs 434 for a blender 108 as an individual appliance 266 or as part of an integrated appliance 101. The appliance program 434 table may include two categories: a source 450 of an application program and appliance program 434 used to operate the blender 108. The source 450 may include as examples an application program based on a recipe 431 as shown in the rows associated with recipes 260. More particularly, the table contains the following application programs 434 based on recipes 430: wild berry smoothie 260A and hint of mint smoothie 260B. The source 450 also may include as examples an application program based on a container 432 as shown in the rows associated with containers 264. More particularly, the table contains the following application programs based on containers 432: a single serving inverted container 464 (such as, the Vitamix 8 oz. Low Profile Container); a multiple serving inverted container 206B (such as, the Vitamix 24 oz. Container); a classic blender container 206A (such as, Vitamix 64 oz. Classic Container); and, a commercial container 106 (such as, a 64 oz. Classic Container) used in an integrated appliance 101. The programs 434 may include serving sizes 452 associated with recipes 260 and volume ranges 454 associated with containers 264. Subcategories of serving sizes 452 are 1-2, 2-4, 4-6 and 6-8. Subcategories of volume range 454 are: 4-12 oz., 12-24 oz., 24-48 oz. and 48-56 oz.

For each of categories of source and program, a graph as a representation of an appliance program 434 is shown. In addition, the shaded portion (or other change to the visual appearance) of the graphs 474, 476, 478, 480, 484 and 170 may provide an indication of the portion of the graph operating parameters, such as power, speed and/or duration, that are completed for the given size 452 or volume 454. In this FIG. 4B example, the larger the size 452 or volume 454, the greater the full processing program which is executed for the blender 108. corresponds to the high end of the range of the serving sizes 454 or volume range 455. For example, for the integrated appliance 101 including the blender 108 with a commercial container 106 (as also shown in FIG. 1), the graph 170 includes several iterations showing a portion of a completed graph 170 for each of the available volume ranges 454 shown. More particularly, the graph 170A, as also is shown in FIG. 1, corresponds to a commercial appliance 101 including a container 106 with a maximum volume of 64 oz. where the volume range is between 24-48 oz. The graph 170A further represents that the completion of processing at the 48 oz. volume level is a duration depicted by a vertical line 490. Additional examples of graphs as representations of an appliance program 434 is as follows: as shown by the graph 480A, a multiple serving inverted container 206B at a maximum 12 oz. volume 454 of a volume range 4-12 oz. processes the graph 480A for a duration depicted by vertical line 492 on the graph 480A; as shown by the graph 478, a single serving inverted container 464 at a maximum 12 oz. volume 454 of a volume range 4-12 oz. processes for a duration depicted by vertical line 494 on the graph 478; as shown by the graph 476D, a hint of mint smoothie 260B at a maximum serving size 452 of 8 within a serving size range of 6-8 processes for a duration depicted by vertical line 496 on the graph 476D; and as shown by the graph 474B, a wild berry smoothie 260A at a maximum of serving size 452 of 4 within a serving size range of 2-4 processes for a duration depicted by vertical line 498 on the graph 474B.

This table 402 also demonstrates that a graphical representation of an appliance program 434 may be processed through the maximum duration for a maximum serving size 452 or volume range 454. In additional examples, there may be an indication for a given graph of the maximum duration of processing when the graph is presented for a given recipe 260. In this way, the graph 170A may further present to a user 124 a comparison between the present and maximum duration of the operation of an appliance. The appliance program scaling 438 may be used by the recipe processing app 202 to process the duration for a given serving size 452 or volume 454 of recipes 260 or containers 264, respectively. For example, in FIGS. 11B-11C, a container 206B is shown as being detected by the recipe processing app 202. Based on the container 206B detection, the recipe processing app 202 may display the specifications of the container 206B on the UI 105. The specifications include a volume range 454 of the container of 4-24 oz. for the container 206B and a graph 480 specified for the container 206B. The recipe processing app 202 also calculates the volume of the recipe 260B of the "Hint of Mint Smoothie" of 20 oz. In an alternative example shown in FIG. 11C, a graph 480C may be used for the recipe 260B prepared in the container 206B. The graph 480C shows a shadowing (or other change to the visual appearance) below the graph of 480C corresponding to the recipe 260B volume of 20 oz. The integration of the operation of such appliances 266 with the recipe processing app 202 and the provision of feedback and guidance on a UI 105 to the user 124 will result in the increased consistency, quality and efficiency of the preparation of foodstuffs.

Figure 4C:
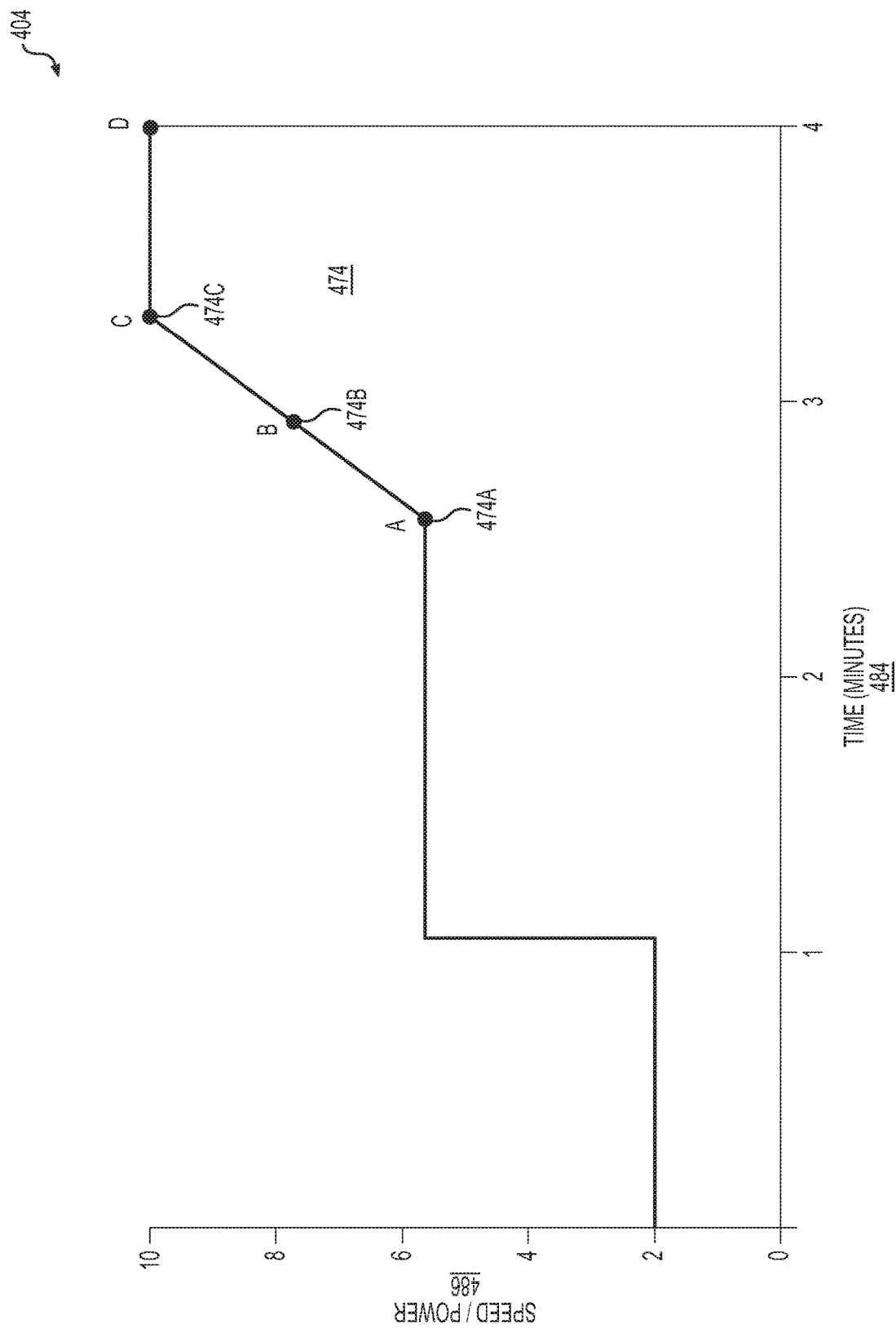

FIG. 4C is an illustrative data structure 404 in the form of an exemplary graph 474 as a representation of the operation of an appliance 266 (such as, for example, a blender 108 or 208) according to an appliance program 434. One example of an appliance program 434 is a blender program 434 and one source of the program 434 may be an appliance program based on a recipe 431. The graphical representation includes x and y-axes with the x-axis representing time or duration and the y-axis representing speed or power. The graph 474 further may represent a blender program 434 associated with a recipe 260 from FIG. 4B. More particularly, the graph 474 corresponds to the Wild Berry Smoothie recipe 260A blender program shown in FIG. 4B is a general graph 474, graph 474A for a serving size 452 of 1-2, graph 474B for a serving size 452 of 2-4, graph 474C for a serving size 452 of 4-6 and graph 474D for a serving size 452 of 6-8. The FIG. 4C graph also includes data points A, B and C to demonstrate the duration of processing associated with approximately 2.6 minutes for A corresponding to a serving size 452 of 2 within a serving size 452 range of 1-2, 3 minutes for B corresponding to a serving size 452 of 4 within a serving size 452 range of 2-4, 3.4 minutes for C corresponding to a serving size 452 of 6 within a serving size 452 range of 4-6, and 4 minutes for D corresponding to a serving size 452 of 8 within a serving size 452 range of 6-8.

Figure 5:
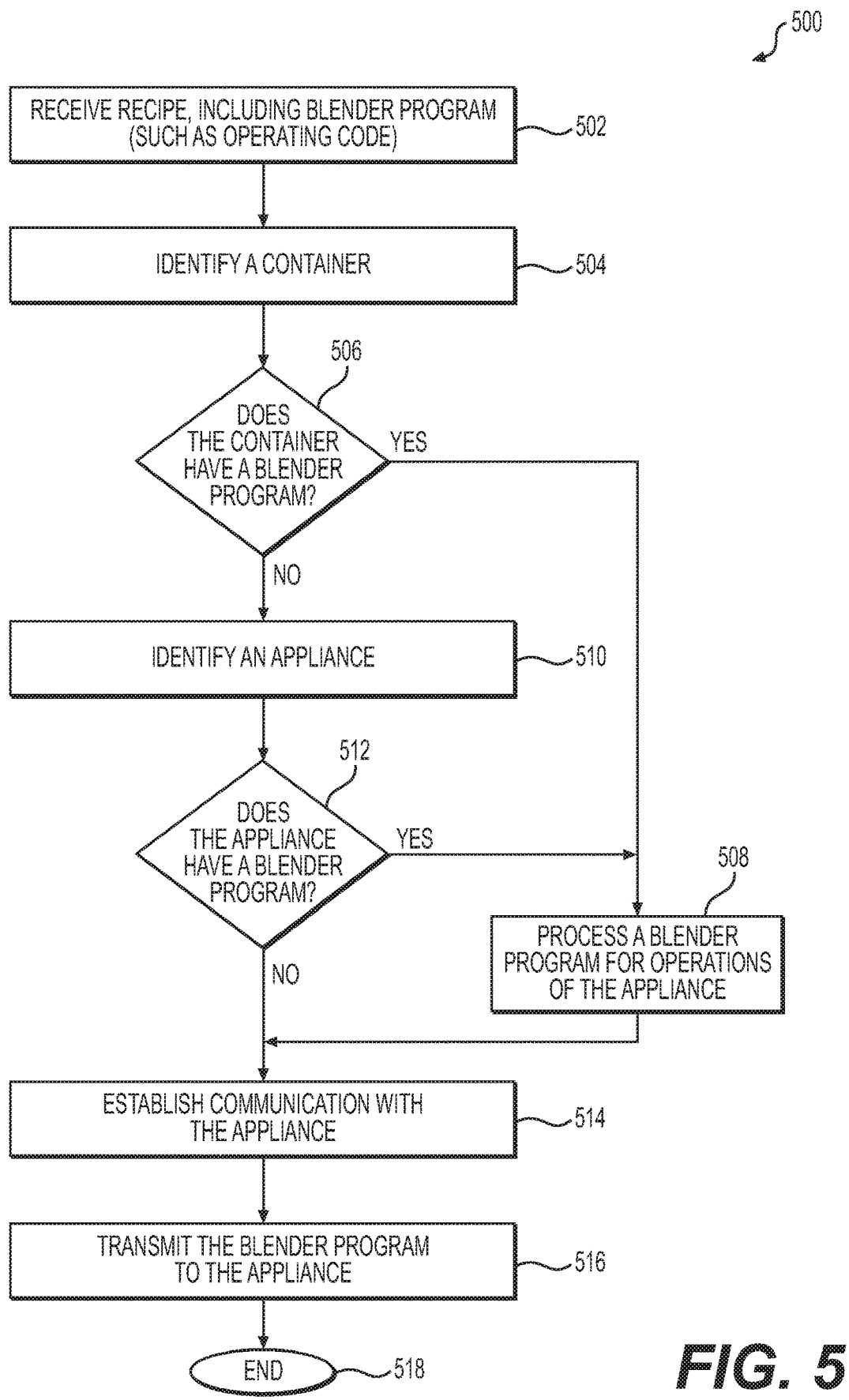
FIG. 5 is a flow diagram showing a process for receiving a recipe from a server and for transmitting appliance data to an appliance and/or for executing actions associated with operating the appliance.

FIG. 5 is a flow diagram showing a process 500 for receiving a recipe 260 from a server and for transmitting appliance data 430 to an appliance 266 and/or for executing actions 262, including applicant operation(s) 436, associated with operating the appliance 266. The appliance data 430 and/or actions 262 may be implemented based on a recipe processing app 202 interacting with an appliance 266 (such as appliance 101, 208 and/or 204) in order to operate the appliance 266 based on an appliance program 434 (such as a blender program 434). The blender program 434 may derive from any one or more of a number of sources, such as a part of a recipe 260 (for example, as stored in the recipe 260 metadata as an appliance program based on a recipe 431), an appliance 266 (such as appliance 101, 208 and/or 204, for example, as stored in the appliance 266 metadata as an appliance program 434) or a container 254 (for example, as stored in the container 264 metadata as an appliance program based on a container 432). For example, the recipe 260 may identify an appliance 101, 208 and/or 204 and that appliance may have an appliance program 434 associated with it. The recipe 260 may identify the appliance as part of appliance data 430 for the recipe 260 or based on detecting the appliance 101, 208 and/or 204 on a network 145. In other examples, the recipe 260 similarly may identify a container 254 and that container may have an appliance program based on a container 432 associated with it. The recipe 260 may identify the container as part of appliance data 430 for the recipe 260 or based on detecting the container 264 placed on a scale 204 or detected as part of an appliance 266 that detects an NFC container tag on containers 254 equipped with an NFC tag detection processing.

The process 500 generally involves the recipe processing app 202 receiving a recipe 260, identifying a container 264 and/or an appliance 266 and transmitting the appliance program 434 to the appliance 266. The appliance 266 used for exemplary purposes in this process 500 is a blender 108 or 208. In other examples, such as where the appliance 266 already includes an appliance program 434, the recipe processing app 202 may alternatively communicate with the appliance 266 in order to initiate the appliance program 434 of the appliance 266. The process 500 example is now described. The process 500 is illustrated as a collection of blocks in a logical flow graph, which represents a sequence of operations that may be implemented in hardware, software, or a combination thereof. Numbers 502-518 reference the blocks. Each of the operations 506 and 512 represents the processing of a query with two paths for subsequent processing based on an affirmative indication from the recipe processing app 202 to the query and, alternatively, a negative indication from the recipe processing app 202 to the query.

The process 500 is initiated with recipe 260 data being received from a server (including for example, one or more of the platform servers 214 or other servers). The recipe 260 includes in this exemplary process 500 a blender program 434 based on operating code 430. The operating code 430 can be part of appliance data 430 associated with the recipe 260. Data received in operation 502 is next provided to operation 504, where a container 264 is identified. Operation 504 then prompts operation 506. At operation 506, it is determined whether the container 264 has a blender program 434. In one example, the recipe processing app 202 may include as part of appliance data 430 a container 264 (such as for example, where the appliance data includes an appliance 266 with a single container or with multiple containers 264 and a container 264 is specified as well) and an associated blender program 434. In another example, the recipe processing app 202 may receive an identification of a container 264 that also includes a blender program 434 (for example, the appliance program based on a container 432). If the recipe processing app 202 produces an affirmative indication, operation 508 is invoked. In operation 508, the recipe processing app 202 processes the blender program 434 provided by the container 264 for the operation of the appliance 266. There are several approaches to the recipe processing app 202 processing this data. In one example, the recipe processing app 202 may override the appliance program 434 associated with the recipe 260 with the appliance program based on the container blender program 432. In another example, the recipe processing app 202 may reconcile the multiple blender programs by averaging them or creating an aggregate or composite program, or applying the data from the multiple blender programs to provide selected or new operating parameters, operating code 435 and/or appliance operation(s) 436, or similar. Upon the completion of processing in operation 508, the process 500 continues with operation 514.

Returning to operation 506, if the recipe processing app 202 produces a negative indication, operation 510 is invoked. At operation 510, the recipe processing app 202 identifies an appliance 266. Then at operation 512, it is determined whether the appliance 266 has an appliance program 434. In one example, the recipe processing app 202 may include as part of appliance data 430 an appliance program 434 or the recipe processing app 202 may identify an appliance 266 with the appliance 266 including an appliance program 434. If the recipe processing app 202 produces an affirmative indication, operation 508 is invoked. In operation 508, the recipe processing app 202 processes the appliance program 434 provided by the appliance 434 (and may include the processing of an appliance program based on a container 432 also provided by the container 264) for the operation of the appliance 266. The approaches described above for processing multiple blender programs 434 apply to this processing as well and may include the additional appliance program 434 associated with the appliance 266. In one example, the various sources of blending programs 434, 431 and/or 432 may be prioritized or otherwise organized by preference. The recipe received in operation 502 may also include a preference list or another approach of reconciling multiple blender programs 434, 431 and/or 432, such as those described above. In yet further examples, the recipe 260 may not include an appliance program based on a recipe 431, so that the source of blender programs 434 for particular recipes may be from one or both of one or more the appliance programs 434 and/or 432 for appliances 266 and/or containers 264, respectively.

Upon the completion of operation 508 from either an affirmative answer in either operation 506 or operation 512, or based on a negative answer in operation 512, processing continues with operation 514. In operation 514, the recipe processing app 202 establishes communication with the appliance 266. Operation 516 is then invoked, in which the recipe processing app 202 transmits the blender program 434 to the appliance 266, such as, for example, appliance 101, 208 and/or 204. Operation 516 then prompts operation 518 or an end to the process 500. In alternative examples, the appliance 266 may already be associated with a blender program 434 aside from one being provided by the recipe 260. In this case, an alternative processing to operation 516 may be to initiate the operation of the appliance 266 based on the blender program 434 accessed by the appliance 266.

Figure 6A:
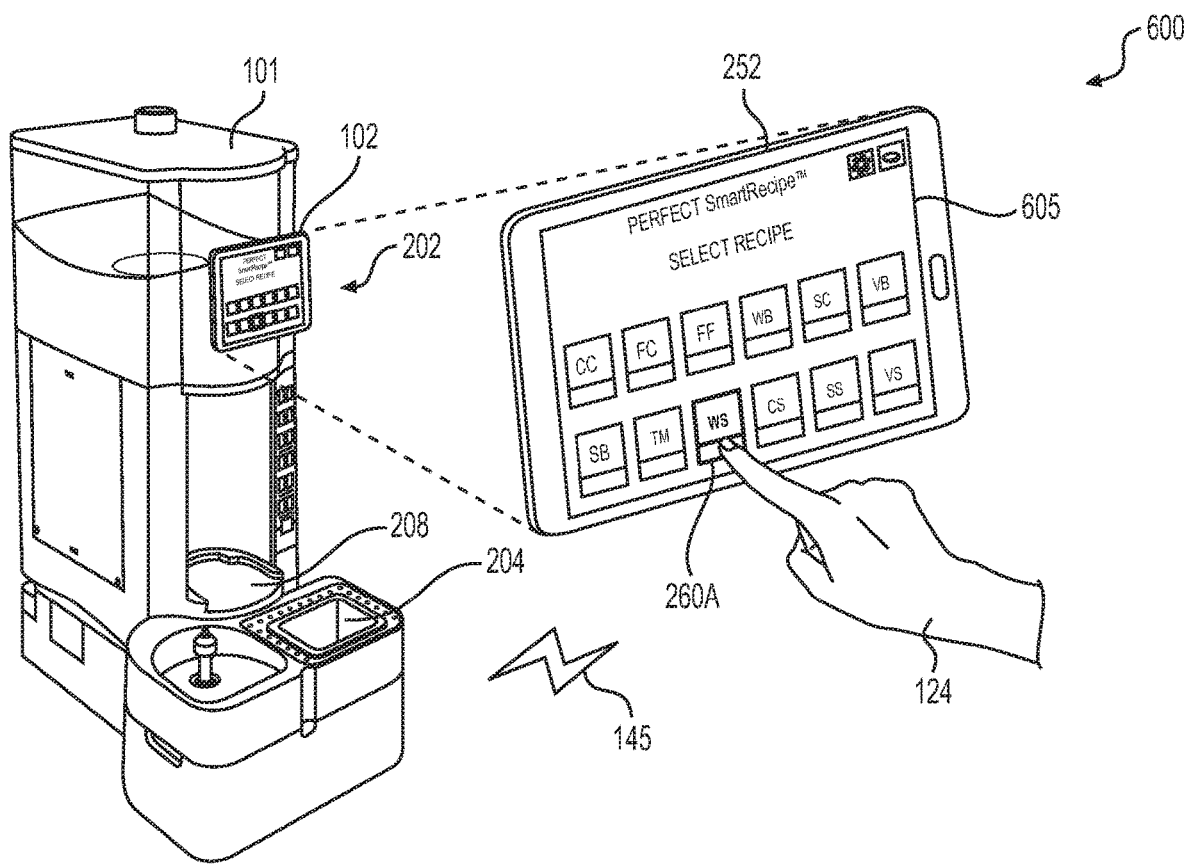
FIGS. 6A-6B depict schematic diagrams of an illustrative example of systems and methods based on the FIG. 1 appliance, including a smart scale, a blender and a computing device for operating an appliance in order to process a recipe.
Figure 6A:
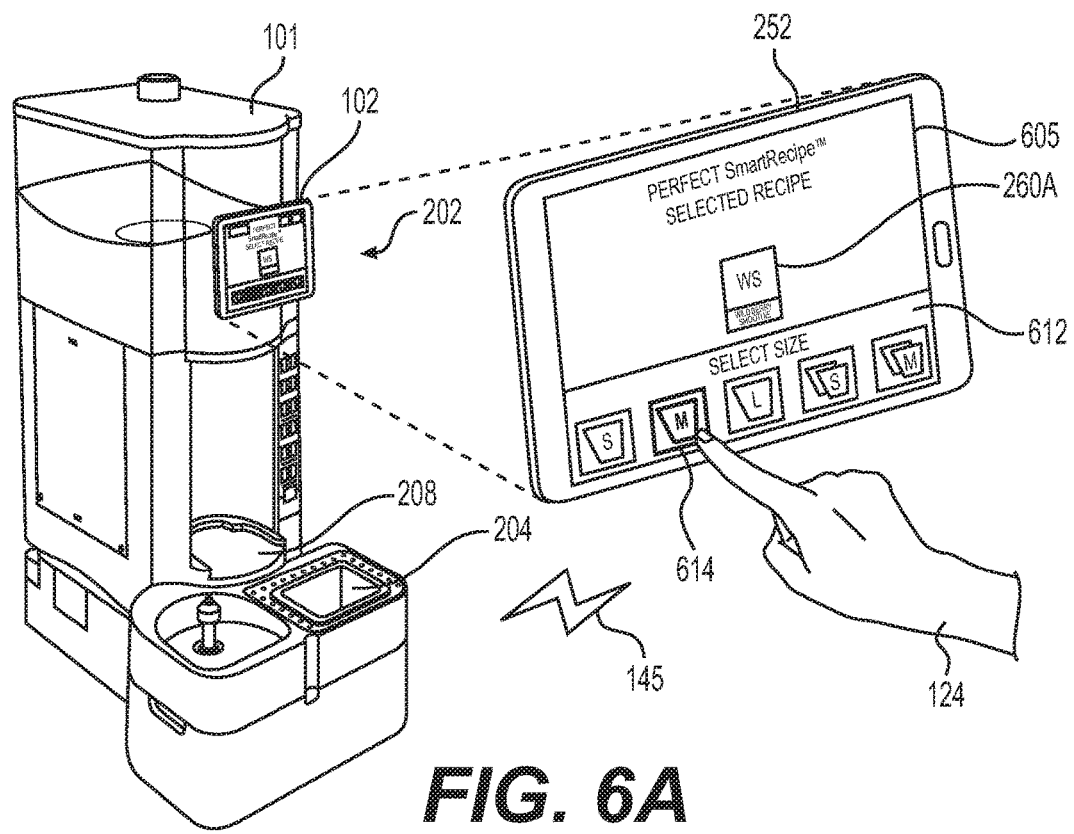
Figure 6B:
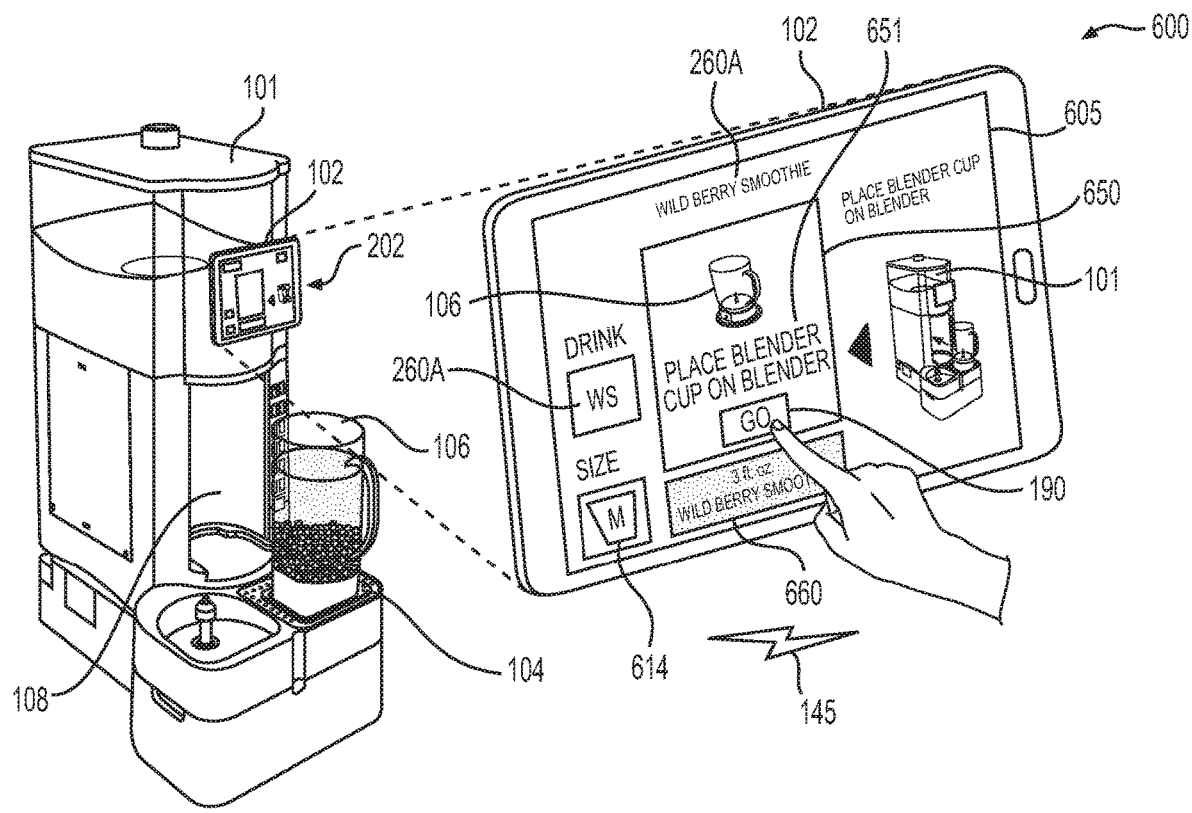
Figure 6B:
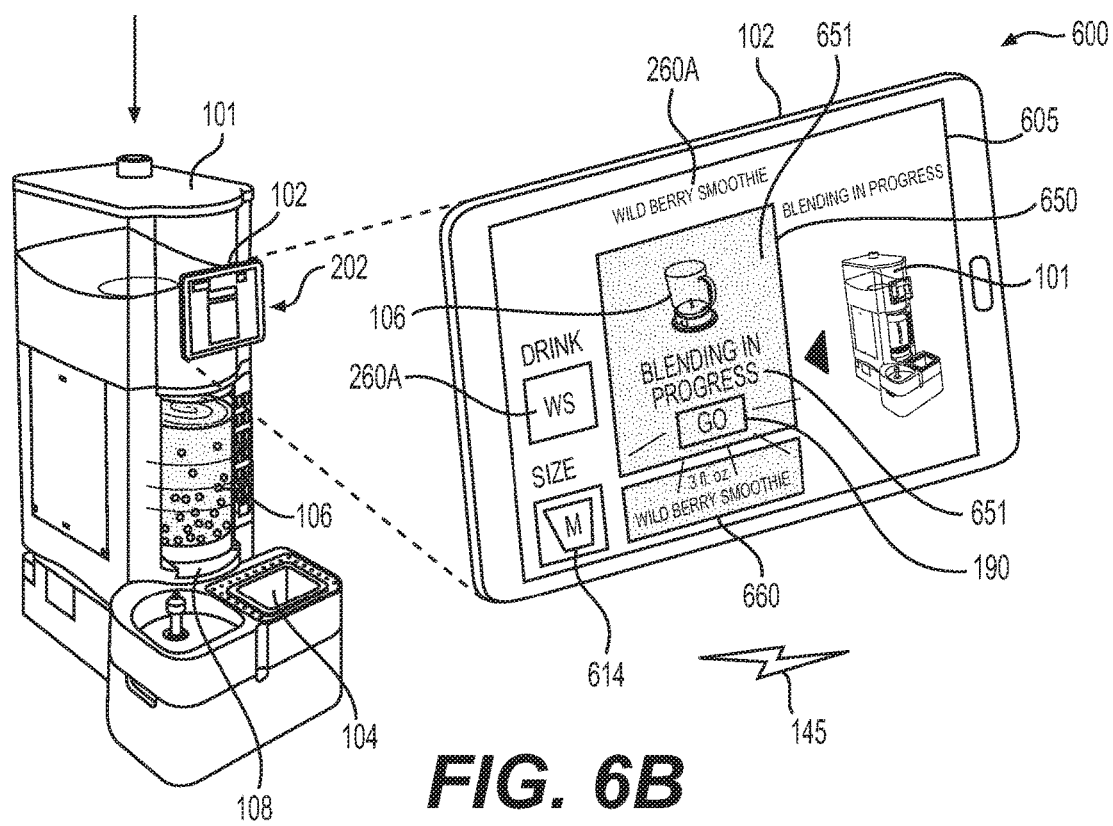

FIGS. 6A-6B depict schematic diagrams of an illustrative example of systems and methods 600 based on the FIG. 1 appliance 101, including a smart scale 104, a blender 108 and a computing device 102 for operating an appliance 101 in order to process a recipe 260A. The computing device 102 may be associated with the appliance 101 through a network 145. The computing device 102 includes the installation of a recipe processing app 202 for guiding a user 124 through the execution of the recipe 260A based on receiving the recipe 260A from the server and for communicating with the appliance 101 in order to operate the appliance 101 based on one of the appliance data 430 or an action 262. In addition, the recipe processing app 202 may provide feedback to the user (for example, employee 124) based on with one or more indications of the operation of the appliance 101, such as for example, an indication that for a blender 108 of the integrated appliance 101, a blending operation is in progress. In this example, the operation of appliance 101 is triggered by the user 124 activating an appliance data 430 transmit button on the UI 605 recipe action block 650. The recipe processing app 202 then transmits operating code to the appliance 101 for use by the appliance 101. Then, the blender 108 operation is initiated based on the detection by the blender 108 of a container 106 inserted into the blender 108.

The FIG. 6A receipt of the recipe 260 and automated operation of the appliance 101 is now discussed. The computing device 102 may be configured to allow a user 124 to access and interact with any components of the systems and methods 600 via the recipe processing app 202 installed on a computing device 102. The computing device 102 may include the user interface UI (605), one or more processors, electronic storage, and other components. The computing device 102 may send commands to or receive requests or prompts from the appliance 101.

A recipe 260 may be conveyed from a central source in the central source environment 242, such as one or more central processor(s) at one or more central server(s) through the platform 210 to any of the local store environment 120. In one example, the user 124 utilizes a computing device 102 to view recipe data 260, which may be present in the memory of user computing device 102 or may be retrieved from a recipe service (for example, as provided or accessed by the Perfect SmartRecipe™ platform 210). More particularly, in the top portion of FIG. 6A, the recipe processing app 202 generates the UI 605, which may show a recipe selection display including one or more recipes 260 for selection by the user 124. The UI 605 presents the title "Perfect SmartRecipe™ Select Recipe" and a list of recipes 260 which, in one example, results from processing by the central source environment 242 of recipes 260 for distribution to one or more local store environments 120 in which the appliance 101 is being utilized. The system 600 further illustrates a user, such as an employee 124, selecting the "WS" recipe 260A on the UI 605 in the bottom portion. The user's 124 selection then prompts the bottom portion of FIG. 6A. This bottom portion UI 605 also includes a serving size display 612 with several serving size options, including small "S," medium "M" (shown as 614), large "L," et al. In this example, the user 124 then selects the medium "M" size 614. Upon selection, the system and methods 600 of the present disclosure may calculate target recipe 260A measurement according to the serving size selected by the user 124. The measurement may include the volume or weight of the total recipe 260 for scaling the appliance program 434 in order to operate the blender 108. The measurement may also later be used by the recipe processing app 202 or appliance 266 in order to determine the application program scaling 438, which in turn, may be used to generate a graphical representation (such as shown in FIG. 1, the graph 170A) of the operating code 435 and/or the appliance operation(s) 436.

FIG. 6B then illustrates the blender 108 operations. The UI 605 includes an indication of the "WS" Wild Berry Smoothie recipe 260A (on the left-hand column as well as the header) and the "M" medium serving size 614 (on the left-hand column). To execute the recipe 260A, a user 124 successively performs operations depicted in recipe blocks 660 and 650. The recipe actions 262 may be presented in recipe action blocks 650 and the ingredients 416 may be presented in recipe ingredient blocks 660. The recipe blocks 650 and 660 may contain one or more of visual, textual, audio and/or video information about each ingredient, such as shapes, a listing of each ingredient 416 and/or nutritional information, or similar data associated with the recipe 260, ingredients 416 and actions 262 to prepare the foodstuff. In one example, at any moment, at most one recipe block may be the active recipe block, which corresponds to the recipe ingredients and/or action(s) the user 124 is currently performing. In alternative examples, multiple recipe blocks may be active, such as for different ingredients 416 or actions 262 of the recipe 260, such as for example, with two users executing the recipe or one action being to set aside one or more ingredients 416 while performing steps on other ingredients 426 (such as a cake and icing), or similar.

The recipe processing app 202 may automatically activate the first recipe block. As the recipe step(s) of an active recipe block 650 or 660 are performed, the appearance of the active recipe block 650 or 660 may change to signal the interim state of completion of the recipe block. For example, if the action associated with an active recipe action block 650 is a timer action, the background of the active recipe action block 650 may be modified in a manner to suggest the portion of total time that has elapsed since the timer step started. Once an active recipe block 650 has been completed, the active recipe block 650 may be deactivated and a next successive recipe block 650 or 660 may be activated. When an active recipe block 650 or 660 is deactivated, the visual appearance of the recipe block 650 or 660 may be modified to signal the completion of the associated recipe action. Determination of the completion of an active recipe block 650 or 660 may be performed automatically by recipe processing app 202 or may be signaled by user input.

The subject actions in this example occur after ingredients 416 for the recipe 260A have been added to a container 106. The process of adding the ingredients 416 include placing a container 106 onto a scale 104, adding ingredients 416 for measurement on an individual basis and measuring an actual weight of each one of successive ingredients 416 for communication to the recipe processing app 202. More particularly, FIG. 6B includes a recipe ingredient block 660 for the last ingredient 416 of recipe 260A, or a Wild Berry Smoothie base as shown in the block 660. This example assumes that the remainder of the ingredients 416 of the recipe 260A is completed, and the recipe 260A execution proceeds to a recipe action block 650. The top portion of FIG. 6B illustrates the completion of recipe ingredient block 660, including "10 oz. Wildberry Smoothie" while the container 106 is on the scale 104. As a result of the completion of the ingredient 416, the appearance of the block 660 is shaded (or is changed based on another visual appearance). The top portion of FIG. 6B also shows the recipe action block 650, including pictorial and narrative instructions, such as a depiction of the blender container 106 and the instruction 651 to "place blender cup on the scale" (with a blender container and cup being interchangeable). In addition, in this example, the UI 605 block 650 also includes a data entry button, the GO button 190, for a user to activate in order to send appliance data 430 corresponding to a blender program 434 to the blender 108. Upon activation of the GO button 190 by the user 124, the recipe processing app 202 then transmits operating code to the appliance 101 for use by the blender 108. Then, the blender 108 operation is initiated based on the detection by the blender 108 of a container 106 inserted into the blender 108. Further, in this example, there is a pictorial of the appliance 101 on the right of the UI 605 with an indication of movement of the container 106 onto the blender 108. The bottom portion of FIG. 6B then illustrates the completion of the recipe action block 650 (including a change in the highlighting of the block as an additional indication of a completion of the action 262) after the appliance 101 has received the container 106 on the blender 108. The bottom portion further shows that the blender 108 is processing the ingredients 416 in the container 106. In this example, the blender 108 has detected the insertion of the container 106 to prompt the operation of the blender 108. Based on the blender 108 operation, the bottom portion of FIG. 6B also shows the recipe action block 650, including pictorial and narrative instructions as shaded (or another visual indication), and the GO button 190 as illuminated or otherwise changed in visual appearance to indicate completion of the recipe action block 650.

Figure 7A:
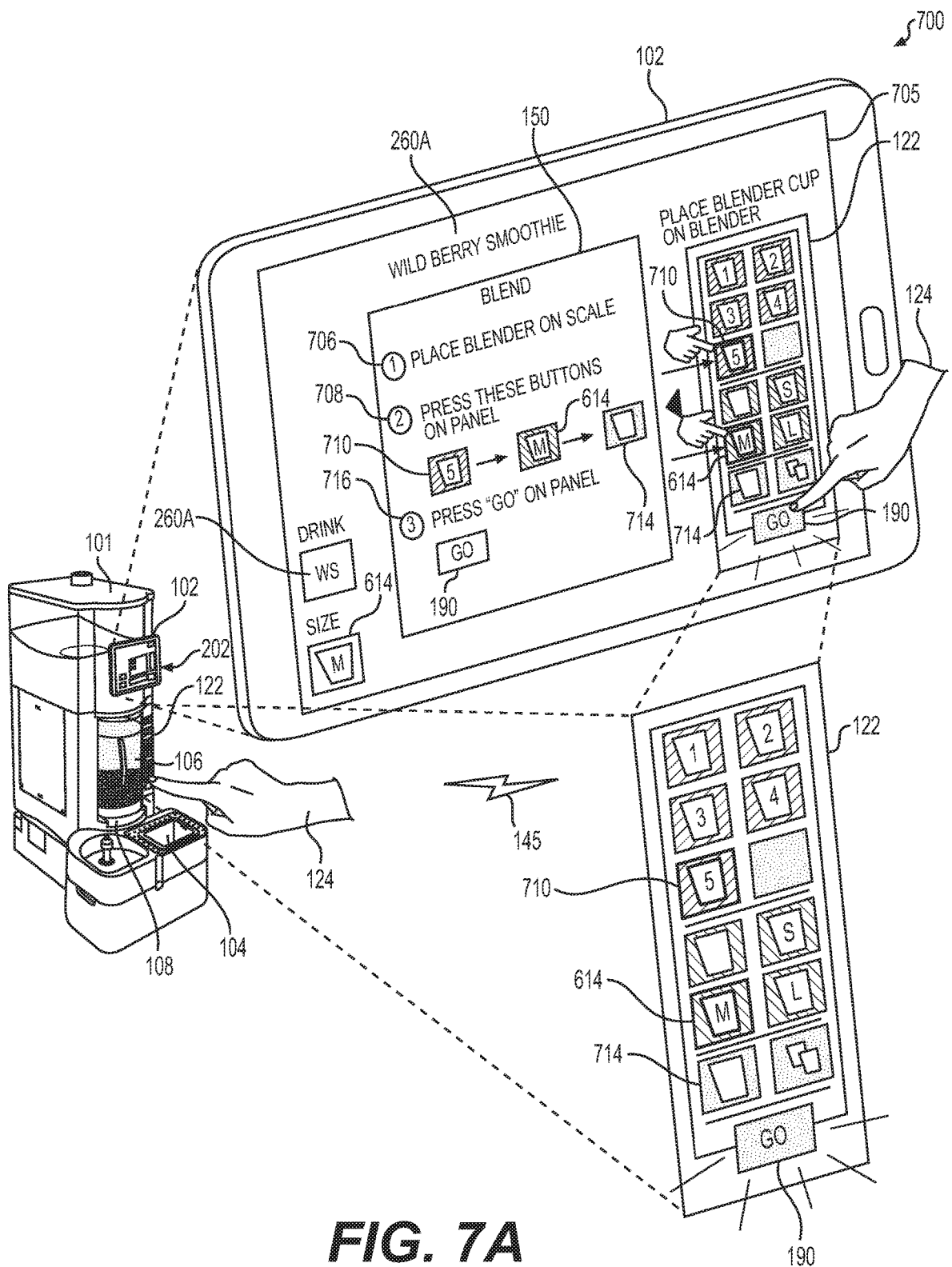
FIGS. 7A-7B depict schematic diagrams of an illustrative example of systems and methods based on the FIG. 1 appliance, including a recipe processing app providing a variety of display options and feedback for the operation of the appliance.
Figure 7B:
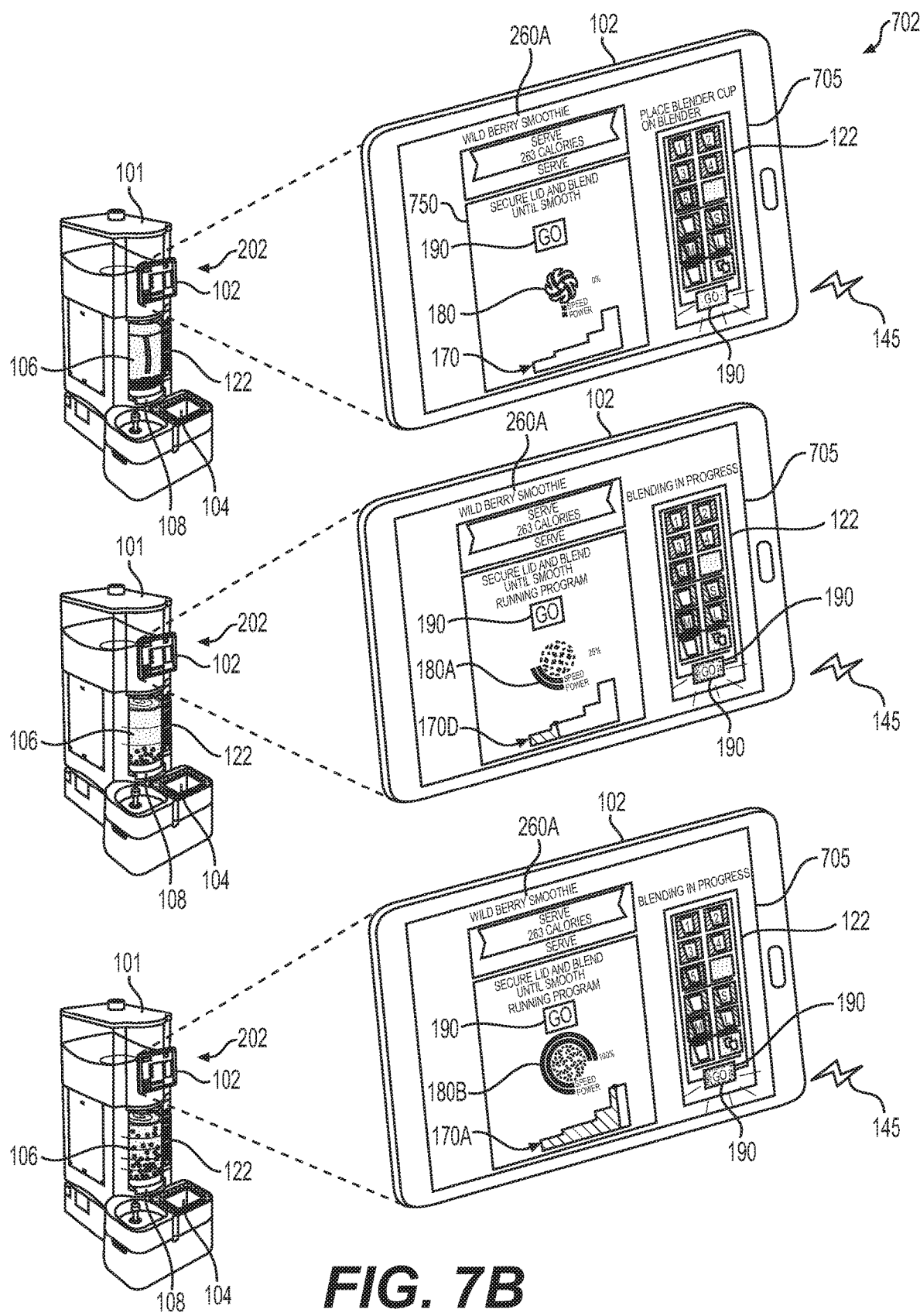

FIGS. 7A-7B depict schematic diagrams of an illustrative example of systems and methods 700 based on the FIG. 1 appliance 101, including a recipe processing app 202 providing a variety of display options and feedback for the operation of the appliance 101. The subject actions in this example occur after ingredients 416 for the recipe 260A (including Wildberry Smoothie 260A in a serving size of M 614) have been added to a container 106, and the container 106 is moved to the blender 108 of an appliance 101. The computing device 102 is operated by a recipe processing app 202 and includes the user interface (UI) 705. The recipe processing app 202 receives the recipe 260A and communicates with the appliance 101 and/or its integrated components of the blender 108 through a network 145.

In FIG. 7A, the recipe processing app 202 UI 705 may present the next recipe action block. FIG. 7A further presents "blend" instructions in a recipe action block 750 based on the UI 705 presenting one or more indications associated with actions 262 for the recipe 260A. In this example, the blend instructions shown in recipe action block 750 include visual depictions of data entry buttons from the control panel 122, and in this respect, may be considered to incorporate portions of the control panel 122. The UI 705 one or more indications may support user actions or data entry options. The data associated with the subject appliance, such as appliance 101 may guide the user's execution of one or more processing steps. For example, a recipe action block 750 may include instructions for one or more data entry selections or other data related to processing steps for one or more portions of the appliance control panel 122. Also, the UI 705 may be operable for data entry. For example, an interaction by a user 124 with the UI 705 may initiate the operation of the appliance 101. The control panel 122 is depicted in FIG. 7A as enlarged for illustration purposes with a dotted line association to both of the appliance 101 and the UI 705. More particularly, the operability of one or more indications on the UI 705 associated with one or more portions of the control panel 122, may function in the same manner as if a user 124 selected the same or related data entry options on the actual control panel 122 located on the appliance 101.

However, the instructions 750 need not provide a duplication of any portion of the control panel 122. Instead, the instructions may provide a narrative, or another representation, including photographs, videos or any form of data, that may convey to the user 124 information related to operating the appliance 101. An alternative example of using only a portion of the control panel 122 is in FIG. 1, where only the use of the GO button 190 of the control panel 122 is shown in the recipe action block 105.

The FIG. 7A recipe action block 750 is now described. The block 750 includes three instructions labeled (1) 706, (2) 708 and (3) 716. Instruction (1) 706 is to "place blender cup on blender." Instruction (2) 708 is to "press these buttons on the panel." The "panel" referenced in this instruction of recipe action block 750 is the appliance control panel 122 of the appliance 101 shown on the appliance 101 in this FIG. 7A. There is no additional display option on the UI 705 of this example of the appliance 101 control panel 122. Instruction (2) 708 may also include an indication of three buttons to press sequentially, namely button 710 with a "5" indicated on the button (for example, for a blender speed), button 614 with a "M" indicated on the button (for example, for the size of the foodstuff being prepared) and button 714 (for example, for the addition of ice to the blender as it processes the ingredients 416 of the recipe 260A). Finally, instruction (3) 716 is to activate the GO button 190. In this example, the UI 705 control panel 122 is operable (such as, for example for buttons 710, 614, 714 and 190) on the computing device 102 to receive data entry in order to operate the appliance 101.

This FIG. 7A example also depicts an additional interaction between the control panel 122 on the UI 705 and the appliance 101. The additional interaction is an indication of the receipt of data entry from either the appliance 101 or the UI 705 control panel 122, on both of the control panels 122 presented on the appliance 101 and the UI 705, such as illuminating individual data fields, presenting a blinking function, or displaying other icons. In this example, the GO button 190 is illuminated (or another change to the visual appearance) in order to depict that it is activated based on data entry received on the UI 705 control panel 122. The same illumination may occur with the user 124 activating the button 190 on the appliance 101 control panel 122 as well.

FIG. 7B further depicts the blender 108 in operation and includes successive updates to the recipe action block 750 of the UI 705 after the instructions in block 750 of FIG. 7A have been executed. The updates to the block 750 for each of the top, middle and bottom portions include one or more indications as representation(s) of the blender 108 operation according to an appliance program 434 and operational parameters (including as examples, the duration and speed/power). More particularly, each of the top, middle and bottom portions provide a graph 170 and a dynamic circular icon 180, as described above regarding FIG. 1. The FIG. 7B top portion presents a graph 170 and an icon 180; the middle portion includes a graph 170D and an icon 180B and the bottom portion includes a graph 170A and an icon 180B. The characteristics shown on the graphs 170, 170D and 170A may include measurements of time or duration represented on the x-axis and speed or power represented on the y-axis. The blender program 434 may be represented by the circular dynamic icons 180, 180A and 180B with a rotational component surrounded by two concentric portions of circles components. The rotational component may include a dynamic feature (such as a spinning aspect) to indicate that the blender 108 is processing and the tempo of the dynamic feature may further indicate a power or speed level of the blending process. For the concentric portions of circles component, like the y-axis of the graph 170A, they may be associated with measurements of the speed and/or power of the appliance operation. These portions as well may further include a dynamic feature (such as the length of the concentric circular portion) changing to further indicate a power or speed level of the blending process. In addition, the dynamic circular icon 180 provides an indication of the on or off status of operation of an appliance 101, with the dynamic features adding an operational level or additional data to the on or off status of the appliance.

The successive blocks 750 in FIG. 7B illustrate one example of changes that may be presented on the UI 705 during the operation of the blender 108. In the top portion, the graph 170 may indicate operation parameters of duration and speed/power for the container 106 of the appliance 101 (as shown and described in FIG. 4B). However, as the graph 170 in this example does not indicate appliance operation (such as shadowing or another change to the visual appearance), it may indicate that the blender 108 has not yet started processing. Similarly, the icon 180 in this example does not indicate appliance operation as there is no depiction of movement of the rotation component and the concentric circles do not present a significant length or a notable percentage. As a result, the icon 180 indicates that the blender 108 has not yet started processing. The FIG. 7B middle portion graph 170D and icon 180A indicate that the blender 108 has begun operating based on the shadowing as part of the 170D graph. The graph 170D shadowing is similar to the visual appearance presented in FIG. 4B of different versions of the graph 170 as a function of the duration and speed/power of the blender 108 operation. The icon 180A also demonstrates movement by illustrating a speed of rotation of the rotational component and concentric circles with a percentage level of 30%. Finally, the FIG. 7B bottom portion graph 170D and icon 180B indicate that the blender 108 is processing for a longer duration and higher speed/power based on the increased amount of shadowing for the graph 170A (which corresponds to the graph 170A on FIG. 4B showing processing for the maximum volume range of the container 106 for the appliance 101) and the increased length of concentric circles and increased rotation speed of the rotational component.

Figure 8A:
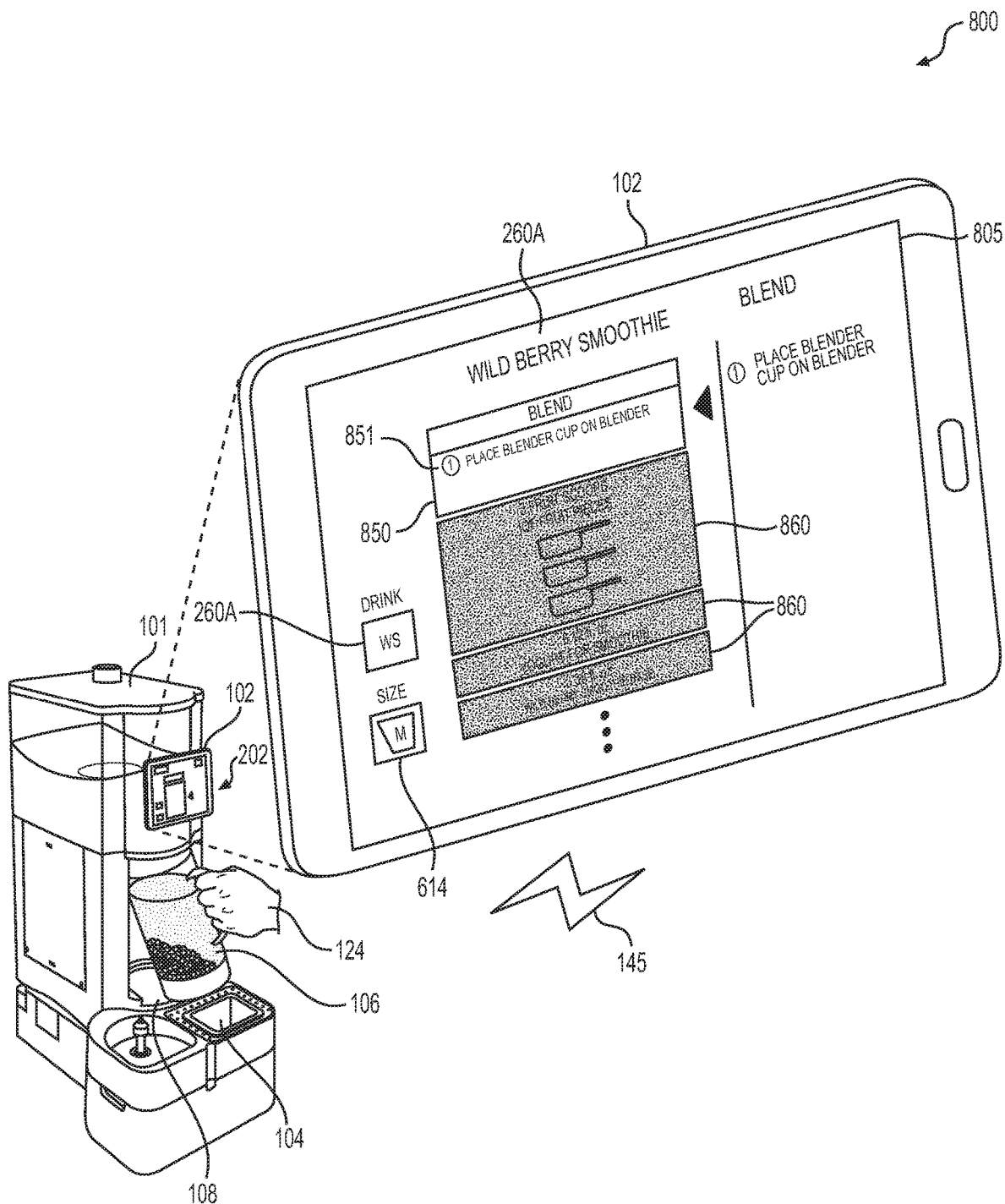
FIGS. 8A-8B depict schematic diagrams of an illustrative example of systems and methods 800 based on the FIG. 1 appliance, including a smart scale, a blender and a computing device for operating an appliance in order to process a recipe.
Figure 8B:
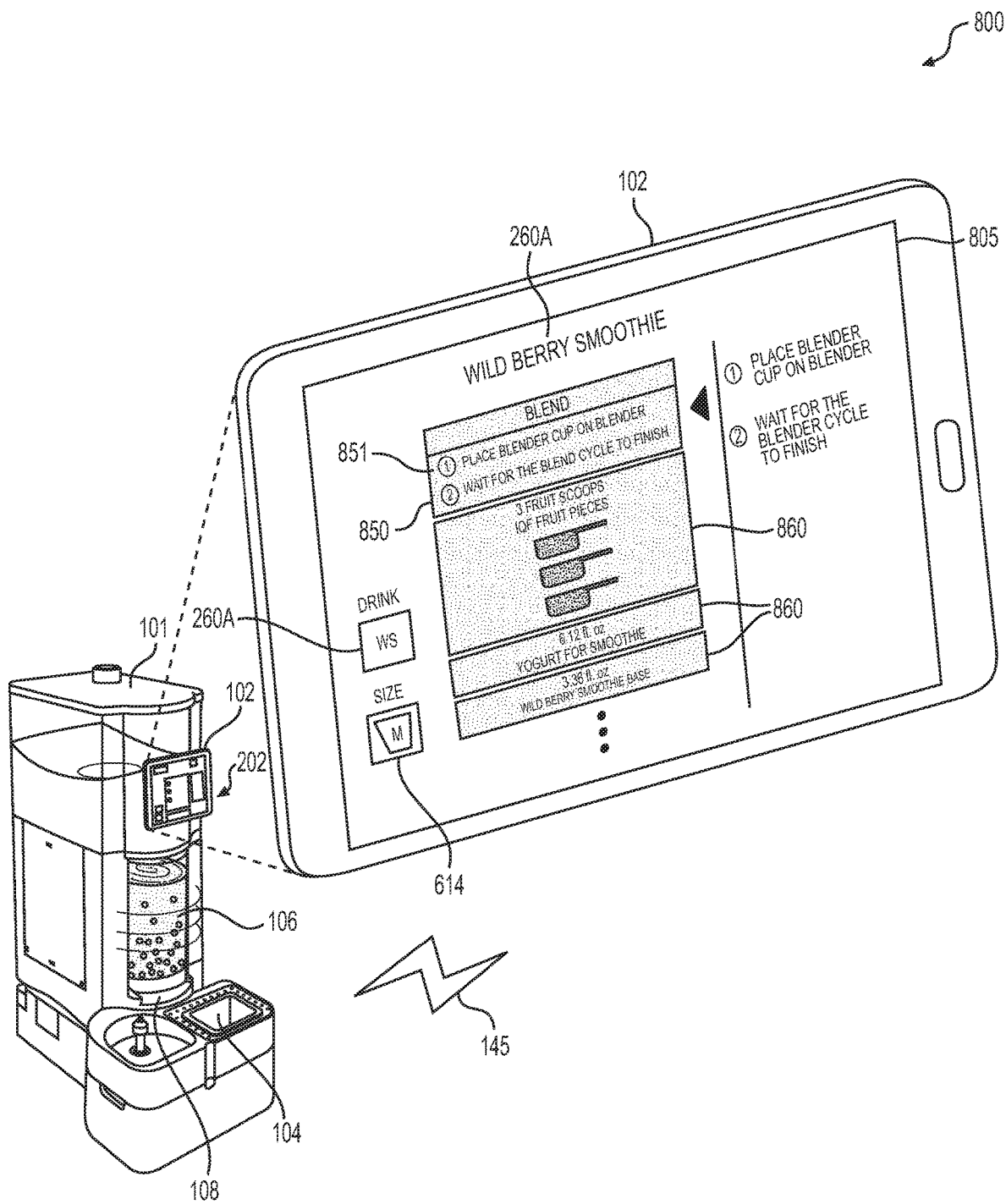

FIGS. 8A-8B depict schematic diagrams of an illustrative example of systems and methods 800 based on the FIG. 1 appliance 101, including a smart scale 104, a blender 108 and a computing device 102 for operating an appliance 101 in order to process a recipe 260A. The computing device 102 may be associated with the appliance 101 through a network 145. The computing device 102 includes the installation of a recipe processing app 202 for guiding a user 124 through the execution of the recipe 260 based on receiving the recipe 260A from the server and for communicating with the appliance 101 in order to operate of the appliance 101 based on, in this example, transmitting appliance data to the appliance 101. In addition, the recipe processing app 202 may provide feedback to the user 124 based on with one or more indications of the operation of the appliance 101, such as for example, an indication that for a blender 108 of the integrated appliance 101, a blending operation is in progress. In this example, the operation of the appliance 101 is automated based on one of the recipe processing app 202 transmitting appliance data 430 to the blender 108 or identifying the appliance 101. In the latter approach, the appliance 101 may be associated with appliance operations 436 for operating the blender 108. Then, the blender 108 operation is then initiated based on the detection by the blender 108 of a container 106 inserted into the blender 108.

More particularly, the FIGS. 8A-8B recipe 260A receipt and appliance 101 automated operation are now discussed. The computing device 102 may be configured to allow a user 124 to access and interact with any components of the systems and methods 800 via the recipe processing app 202 installed on a computing device 102. The computing device 102 may include the user interface UI (805), one or more processors, electronic storage and other components. The computing device 102 may send commands to or receive requests or prompts from the appliance 101.

In FIG. 8A, the recipe processing app 202 generates the UI 805. The UI 805 includes an indication of the "WS" Wild Berry Smoothie recipe 260A (on the left-hand column as well as the header) and the "M" medium serving size 614 (on the left-hand column). To execute a recipe 260, a user 124 successively performs operations depicted in recipe blocks 860 and 850. The recipe blocks and their functionality are described above regarding FIGS. 6A-6B. The subject actions in this example occur after ingredients 416 for the recipe 260A have been added to a container 106. More particularly, FIG. 6A includes recipe ingredient blocks 860 shown as completed for several ingredients 416 of the Wild Berry Smoothie 260A as follows: 3.36 fl. oz. of Wild Berry Smoothie base, 6.12 fl. oz. of Yogurt for Smoothie and 3 Fruit Scoops 1 QF Fruit Pieces. As a result of the completion of the ingredients 416, the appearance of the blocks 860 is shaded (or another change to the visual appearance). The recipe 260A execution then proceeds to a recipe action block 850 titled "blend," including in this example, a narrative instruction "place blender cup on blender." In this example, the user 124 then moves the container 106 with the ingredients 416 to the blender 108.

FIG. 8B then illustrates the completion of the recipe action block 850 (including a change in the highlighting of the block as an additional indication of a completion of the action 262) after the appliance 101 has received the container 106 on the blender 108. In this example, the blender 108 has detected the insertion of the container 106. The receipt of the container 106 is transmitted to the recipe processing app 202. The recipe processing app 202 prompts the operation of the blender 108. The blender 108 operation may be based on the receipt of appliance data 430 by the recipe processing app 202 or operating code 435 and/or appliance operation(s) 436 associated with the blender 108 that may be stored on the blender 108 or received from the recipe processing app 202, or similar. Based on the blender 108 operation, the recipe action block 850 also shows an update to the narrative instructions to include "wait for the blend cycle to finish."

Figure 9A:
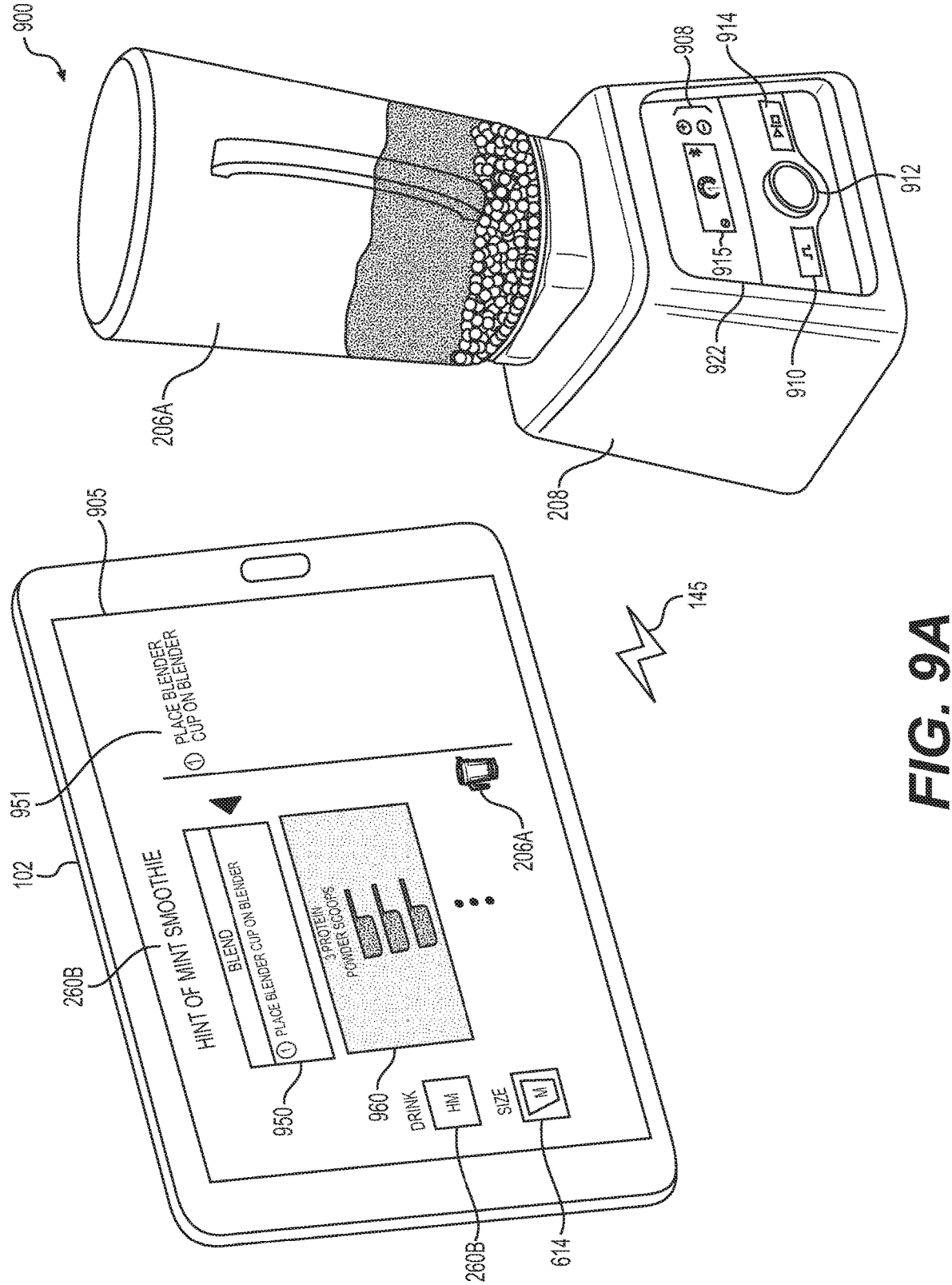
Figure 9B:
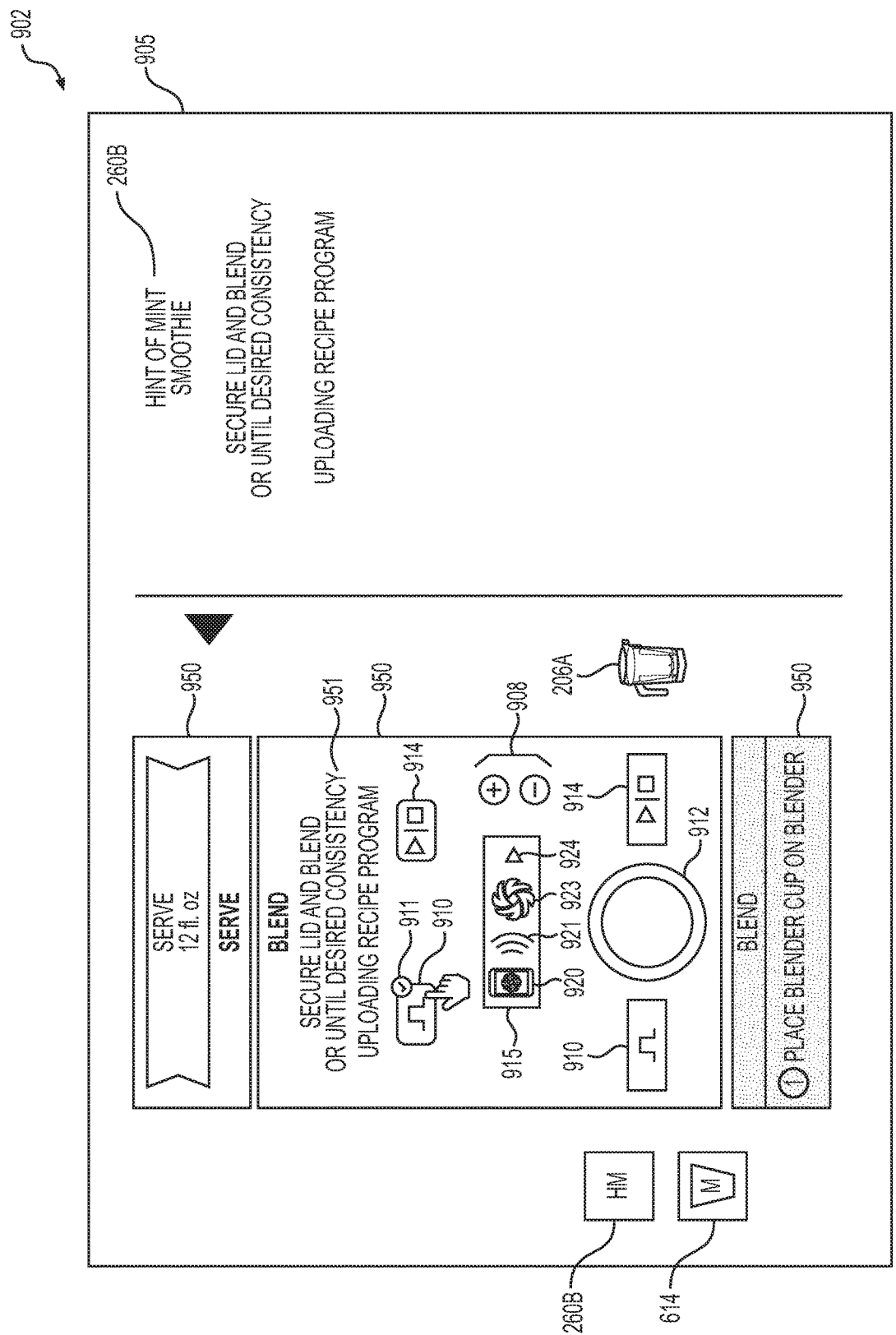

FIGS. 9A-9C depict schematic diagrams of an illustrative example of systems and methods 900 based on an appliance 208, including a recipe processing app 202 providing an exemplary display option and feedback for the operation of the appliance 208. The subject actions in this example occur after ingredients 416 for the recipe 260A (including Wild Berry Smoothie 260A in a serving size of M 614) have been added to a container 206A, and the container 206A is moved to the blender 208. The computing device 102 is operated by a recipe processing app 202 and includes the user interface (UI) 905. The recipe processing app 202 receives the recipe 260A and communicates with the appliance 208 through the network 145.

The subject actions in this FIG. 9A-9C example occur after ingredients 416 for the recipe 260A have been added to a container 206A based on the recipe ingredient block 960 and recipe action block 950. The recipe blocks and their functionality are described above regarding FIGS. 6A-6B. More particularly, FIG. 9A includes recipe ingredient blocks 960 shown as completed for several ingredients 416 of the Wild Berry Smoothie 260A as follows: 3.36 fl. oz. of Wild Berry Smoothie base, 6.12 fl. oz. of Yogurt for Smoothie and 3 Fruit Scoops 1 QF Fruit Pieces. As a result of the completion of the ingredients 416, the appearance of the blocks 960 is shaded (or another change to the visual appearance). A recipe action block 950 may include instructions for one or more data entry selections or other data related to processing steps for one or more portions of the appliance control panel 122. The recipe action block 950, as the next step in the execution of the recipe 260A, is titled "blend" and includes a narrative instruction "place blender cup on blender." In this example, the user 124 has then moved the container 206A with the ingredients 416 for insertion in the blender 208.

The FIG. 9A systems and methods 900 also include communications between recipe processing app 202 and the blender 108 that are associated with the blender 108 control panel 922. The control panel 922 includes a display 915, a series of buttons for data entry 908, an appliance operations button 910, a dial 912 to change the speed of the blender 208 and a play and stop button 914 to control the overall operation of the blender 208. The appliance operations button 910 may correspond to the appliance operations(s) 436 of the appliance 266 (as shown in FIGS. 2 and 4). It may be used to initiate the transmission by the recipe processing app 202 of appliance data 430, such as operating code 435 and appliance operation(s) 436, to the blender 208. The control buttons 908 may provide an increase or decrease to different functions of the blender 208 control panel. The control buttons 908 also may provide a toggle function through information presented on the display 905.

FIG. 9B then illustrates on the UI 905, the action presented in the next recipe action block 950, also titled "blend" (including a narrative instruction "secure lid and blend or until desired consistency" and "uploading recipe program") based on the user 124 activating the appliance operations button 910, as described in more detail below. The recipe action block 950 also may include instructions for one or more data entry selections or other data related to processing steps for one or more portions of the appliance control panel 922. Also, the UI 905 in this example may provide illustrations of data entry buttons that are not operable to receive data entry. Rather, they provide guidance to the user 124 with which to interact with the control panel 922 of the blender 208 in order to implement the actions 262, provided as instructions. In addition, the instructions 950 need not provide a duplication of any portion of the control panel 922. Instead, the instructions may provide a narrative, or another representation, including photographs, videos or any form of data, that may convey to the user 124 information related to operating the appliance 101.

The FIG. 9B recipe action block 950 is now described. The block 950 includes a duplication of the buttons of the control panel 922, namely, the display 915, the series of buttons for data entry 908, the appliance operations button 910, the dial 912 to change the speed of the blender 208 and the play and stop button 914 to control the overall operation of the blender 208. The display 915 also in this example includes several icons in the display 915, including a rotational component with an association to a computing device (such as a phone, not shown), a volume or signal indication 921, another rotational element 923 and a play icon 924. These icons may be dynamic, such as the volume or signal indication 921 may show an increased or decreased volume or signal indication or they may toggle, such as the play icon 924 changing to a stop icon. These icons may also be changed or additional icons added as a function of the information to be provided to the user 124 for guidance and/or feedback about the operation of the blender 208. The UI 905 also may duplicate the display 915 on the blender 208, or the display 915 may show data being transmitted versus the blender 208 display 915 showing the data being received. In this FIG. 9B example, the block 950 also shows that the user 124 has activated the appliance operation button 910 with a check icon 911. The activation of the appliance operation button 910 may initiate the transmission of one of the appliance data 430 or an action 262 to the blender 208. One approach to the use of the appliance operation button 910 is to provide the blender 208 with one or a combination of a portion of operating code 435, complete operating code 435 or appliance operation(s) 436. As a result of activating the appliance operation button 910, the block 950 adds the instruction "uploading recipe program" to the display.

The FIGS. 9A-9C processing then continues with the recipe processing app 202 updating the recipe action block 950 for the next step of processing, as shown in FIG. 9C. The FIG. 9C block 950 is updated to show that the user 124 has activated the play and stop button 914 with a check icon 916 and the display 915 is updated to show one or more indications of operation parameters of the processing. In this example, the display 915 may include the play icon 923, a speed or power icon 928 (such as, showing a speed or power of "10"), a connection indication 925 (to demonstrate a connection with the blender 208) and a duration indication 926 (such as, showing a duration of blending of "54" seconds). The recipe action block 950 also includes one or more additional indications related to the blender 208 in operation by adding a graph 476B. Graph 476B is a representation of the recipe processing app 202 provision of one or a combination of a portion of operating code 435, complete operating code 435 or appliance operation(s) 436 and the use of that appliance data 430 and/or action(s) 262 to operate the blender 208. The graph 476B, as further shown and described regarding FIGS. 4B-4C above, corresponds to the Hint of Mint Smoothie recipe 260B. The characteristics shown on the graph 476B may include measurements of time or duration represented on the x-axis and speed or power represented on the y-axis. The graph 476B shadowing is similar to the visual appearance presented in FIG. 4B of different versions of the graph 476 as a function of the duration and speed/power of the blender 208 operation. The shadowing indicates the operation of the blender 208 and the duration of processing. As further described regarding FIG. 11C, in an alternative example, the graph 480A may show an indication 1480 on the graph 480A of the completion of processing. The completion of processing may be determined based on the serving size and therefore volume of the Hint of Mint Smoothie 260B.

Figure 10:
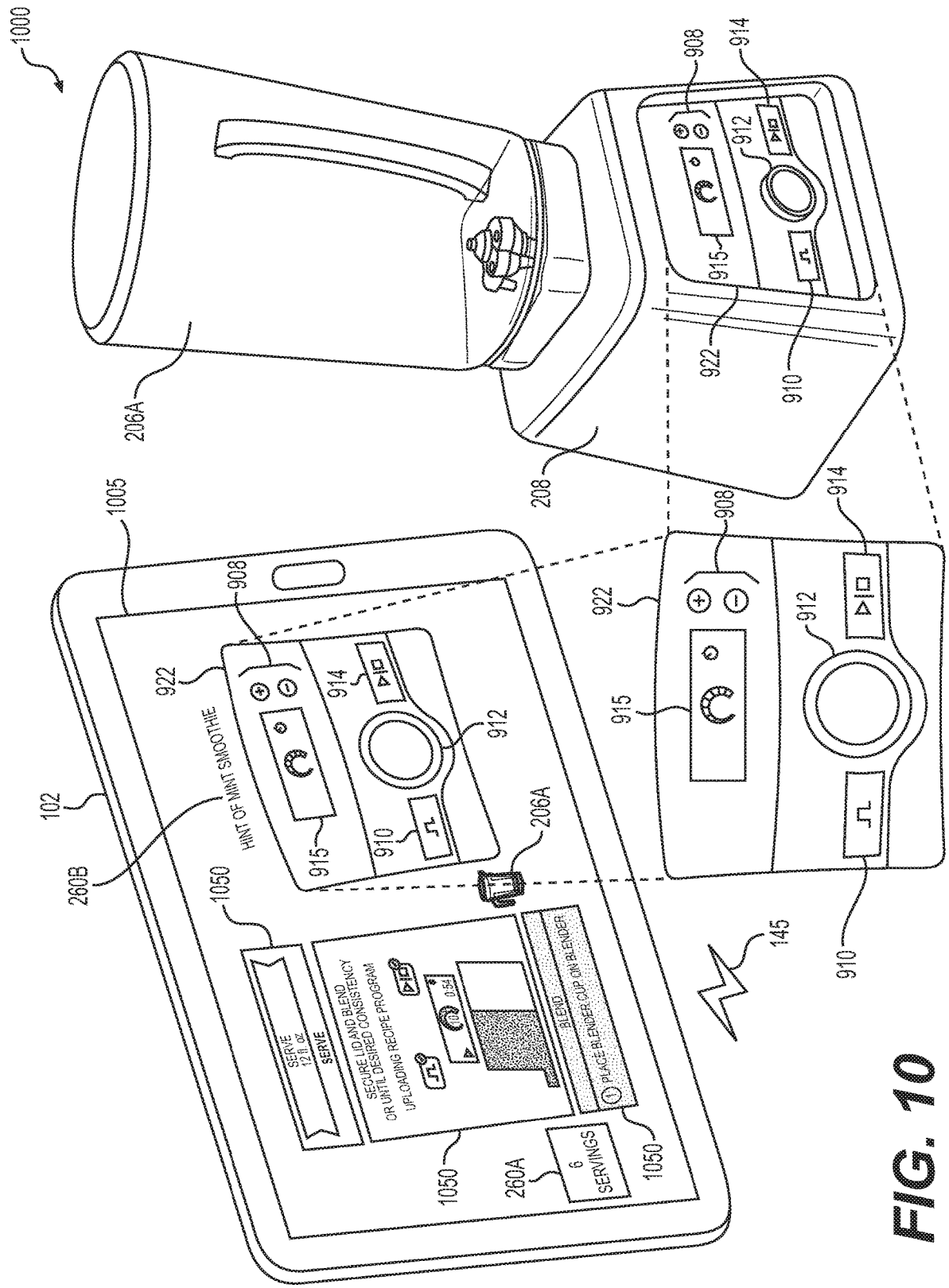
FIG. 10 depicts a schematic diagram of an illustrative example of systems and methods based on the FIGS. 7A-7B appliance with an alternative display option for the user interface.

FIG. 10 depicts a schematic diagram of an illustrative example of systems and methods 1000 based on the FIGS. 7A-7B blender 208, with an alternative display option for the UI 1050. The Hint of Mint Smoothie recipe 260B and the blender 208 are identical to the FIGS. 7A-7B example. However, in this FIG. 10, the alternative display on UI 1050 adds a duplication of the control panel 922 of the blender 208 on the right-hand column. Also, the UI 1005 duplication of the control panel 922 may be operable for data entry for one or more buttons displayed of the panel 922, including a display 915, a series of buttons for data entry 908, an appliance operations button 910, a dial 912 to change the speed of the blender 208 and a play and stop button 914 to control the overall operation of the blender 208. In the FIG. 10 illustration, the control panel 922 also is enlarged for illustration purposes with a dotted line association to both of the UI 1005 and the appliance 208. More particularly, the operability of one or more indications on the UI 1005 associated with one or more portions of the control panel 922, may function in the same manner as if a user 124 (not shown) selected the same or related data entry options on the actual control panel 922 located on the appliance 208.

FIGS. 11A-11C depict schematic diagrams of an illustrative example of systems and methods 1100 based on one or more appliances 266 and including a recipe processing app 202 providing an exemplary display option with serving size and volume data for the recipe 260B and feedback for the operation of the appliance(s) 266. The appliance(s) 266 may include a combination of appliances such as a scale 204 and a blender 208 or solely a blender 208 with added functionality to detect containers 206A, 206B, et al. (such as based on NFC detection). In this example, the recipe processing application 202 receives a recipe 260B and communicates with appliances 204 and 208 through a network 145. The recipe processing app 202 is installed on a computing device 102 with a user interface (UI) 1105 for the display.

The subject actions in this example occur after ingredients 416 for the recipe 260B have been added to a container 206A for subsequent processing by the blender 208. The recipe 260B is the Hint of Mint Smoothie. The UI 1105 also is at a point of processing based on a recipe action block (not shown) with an instruction to "place blender cup on scale" 1151 as also shown on the right-hand column. In FIG. 11A, a scale 204 detects the particular container 206A based on, for example, a weight measurement (in FIGS. 11A and 11B; in FIG. 11C, an NFC detection capability also is added to the blender 208 such that the container 206A placed on the blender 208 may be detected based on the functionality of the blender 208 alone). The UI 1105 also presents the container 206A detected by the scale 204 and processed by the recipe processing app 202 on the right-hand column of the UI 1105.

FIGS. 11A-11C also present for the methods and systems 1100, a display option on the UI 1105 of serving size button 1126. The serving size button 1126 presents, in this example, a serving size of "3." The display option is for the purpose of adjusting the number of servings (shown on the servings button 1126) associated data of the recipe 260B. The amount shown on the servings button 1126 may initially show a serving corresponding to the size selected for the recipe 260B (such as shown in FIGS. 9A-9C on the size button 614) or the user 124 can activate the serving size button 1126 in order to expand the button 1126 to an adjustment servings button 1127. The adjustment servings button 1127 may provide more details about the serving size of the recipe 260B and additional data and entry options to adjust the number of servings and servings by volume or calories. The additional data and entry options include the number of servings 1180, the servings by volume 1186 and the servings by calories 1184. Based on the servings number 1126 shown as "3," a "servings by volume" quantity 1186 is 30 fl. oz. and a "servings by calories" quantity 1184 is 405 calories. The UI 1105 also may include additional data and entry options related to the container 206A as identified and processed by the recipe processing app 202 based on detection by the scale 204. The container 206A related data may include: a container volume scale 1120, labeled "Total Volume, fl. oz." which may be used to display a container volume expressed as a range of maximum and minimum target container volumes 1150 and 1154, respectively, that may be accommodated by the container 206A. The container volume scale 1120 also may include the recipe 260B volume 1152 for the recipe 260B being processed. In this example, the container volume scale 1120 includes the maximum and minimum target container volumes 1150 and 1154 of 56 oz. and 16 oz., respectively, and the total recipe 260B volume 1152 of 30 oz. The container volume scale 1120 also may be shown on the adjustment servings button 1127. The container volume scale 1120 and recipe volume 1152 may be based on the capacity of the container 206A related to efficient and accurate combining or blending of ingredients or other factors. In another example, the recipe volume 1152 may be generated based on nutrient amounts of the ingredients (including volume and/or weight measurements) provided as predetermined in the written recipe 260B. The servings button 1126 quantity also may reflect the quantity provided in the recipe 260B.

FIGS. 11A-11C also may include for the expanded adjustment servings block 1127, additional operation parameters about the container 206A for use in the appliance 208. More particularly, the recipe processing app 202 further identifies appliance data 430 and/or action(s) 262 associated with the container 206A for the operation of the blender 208. The appliance data 430 (such as operating code 435 or appliance operation(s) 436) and/or action(s) 262 may be represented by an appliance program 434, as shown by the graph 482 on the adjustment servings button 1127. As a further example of the functionality of the recipe processing app 202 implemented on the adjustment servings button 1127, the button 1127 may also include a recipe button 1190 for data entry selection by a user 124 (not shown) of alternative sources for automating one or more portions of the operation of the blender 208. Based on a selection of the recipe button 1190, the recipe processing app 202 may process appliance data 430 and/or actions 262 in order to operate the appliance 208 from a different source or a combination of sources other than or in addition to the container 206A. More particularly, in the FIG. 11A example, an option for a "recipe" is shown. As a result, where the recipe processing app 202 receives a data entry for the recipe button 1190, the recipe processing app 202 may assign appliance data 430 and/or actions 262 associated with the subject recipe 260B for the operation of the blender 208. More particularly, in FIG. 11A, a blender program 482 (as described further regarding FIG. 4B above) is shown in the adjustment servings button 1127 of the UI 1105 and the recipe selection button 1190 is provided to enable a user (not shown) to select a blender program associated with the recipe 260B instead. The display on the button 1127 may further be operable to enable the user to select, based on activating the recipe button 1190, an appliance program associated with the recipe 260 rather than to continue with the blender program 482 associated with the detected container 206A. In further examples, the recipe processing app 202 may provide the user 124 with an option of selecting an appliance program 434 from one or a combination of multiple sources, such as a recipe 260 (as shown in FIG. 4A as an appliance program based on a recipe 431), a container 264 (as shown in FIG. 4A as an appliance program based on a container 432) and/or an appliance 266 (as shown in FIG. 4A as an appliance program 434). Where there is a change to the source of an appliance program for the appliance 266, the adjustment serving button 1127 may reflect a new representation of a graph (such as a graph 476 associated with the recipe 260B or an average, compilation, aggregation or another combination of multiple sources of an appliance program processed by the recipe processing app 202). These changes or selections of appliance programs 434, 431 and/or 432 are then processed by the recipe processing app 202 to generate or adjust the operating code 435 and/or appliance operation(s) 436 for the appliance 208.

Other processing and selection options are shown and further described regarding FIGS. 11B and 11C. FIG. 11B depicts a schematic diagram of an illustrative example of systems and methods 1100 based on two appliances 266, a scale 204 and a blender 208. The systems and methods 1100 further include the recipe processing app 202 providing the exemplary display options on the UI 1105. In this example, the recipe processing app 202 receives the recipe 260B and communicates with appliances 204 and 208 through a network 145. The recipe processing app 202 is installed on a computing device 102 with the UI 1105 for the display. FIG. 11B further demonstrates changes to the serving size button 1126 and the adjustment serving button 1127 based on a new container 206B detected by the scale 204. The UI 1105 serving size button 1126 presents, in this example, a serving size of "2." The UI 1105 also is at a point of processing based on a recipe action block (not shown) an instruction to "place blender cup on scale" 1151 as also shown in the right-hand column. The UI 1105 also presents the container 206B detected by the scale 204 and processed by the recipe processing app 202 on the right-hand column of the UI 1105.

Based on the new container 206B, the following data may be adjusted: on the container volume scale 1120, the maximum and minimum target container volumes 1150 and 1154 of 24 oz. and 4 oz., respectively. In addition, in this example, the serving size button 1126 is changed to a serving size of 2 from a previous serving size of 3. This indicates that the recipe processing app 202 determined on an automated basis that 3 servings of the recipe 260B results in a recipe volume 1152 which is too large for the newly detected container 206B. This also impacts the total recipe volume 1152 for an adjustment to 20 oz. The expanded adjustment servings block 1127 also displays adjusted operating parameters based on the recipe 260B serving size change to 2 and the container 206B. The container volume scale 1120, therefore, shows the recipe volume 1152 of 20 oz. The container volume scale 1120 also is duplicated on the adjustment serving button 1127. The button 1127 further adjusts the following data: based on the servings number 1126 shown as "2," a "servings by volume" quantity 1186 is 20 fl. oz. and a "servings by calories" quantity 1184 is 270 calories.

The adjustment servings button 1127 further includes an adjustment to the graphical representation of the appliance program 434 processed by the recipe processing app 202 based on the scale 204 detecting the new container 206B. The graph is adjusted to graph 480 as associated with the container 206B (and also shown and described regarding FIG. 4B). Finally, the FIG. 11B button 1127 also presents the recipe button 1190 to provide alternatives for sources of the appliance program 434 as processed by the recipe processing app 202, as described further regarding FIG. 11A.

FIG. 11C depicts a schematic diagram of an illustrative example of systems and methods 1100 based on one appliance, a blender 208 (with NFC container detection capability). The systems and methods 1100 further include the recipe processing app 202 providing the exemplary display options on the UI 1105. In this example, the recipe processing app 202 receives the recipe 260B and communicates with an appliance 208 through a network 145. The recipe processing app 202 is installed on a computing device 102 with the UI 1105 for the display.

While the data generally on the serving size button 1126 and the adjustment servings button 1127 is the same in FIG. 11C as in FIG. 11B based on the detection of the same container or cup 206B, FIG. 11C also includes an alternative graph 480C. More particularly, the adjustment servings button 1127 further includes an adjustment to the graphical representation of the appliance program 434 processed by the recipe processing app 202 based on the blender 208 detecting the new container 206B. The graph is adjusted to graph 480A as associated with the container 206B (and also shown and described regarding FIG. 4B). The graph 480A also indicates a start and an end of the blender 208 processing with "start" and "end" designations on the graph, with the end designation identified by line 1480. In this manner, the alternative graph 480A conveys both the entire blender 208 processing for the full volume of 24 oz. available for the container 206B, but also the reduction of the full processing for the recipe volume 1152 shown of 20 oz. The recipe processing app 202 may incorporate the appliance program scaling 438 data by adjusting the shadowing and "start" and "end" designations for the button 1127. Finally, the FIG. 11B button 1127 also presents the recipe button 1190 to provide alternatives for sources of the appliance program 434 as processed by the recipe processing app 202, as described further regarding FIG. 11A.

What is claimed is:

1. A system comprising:
a computing device having at least one processor, at least one user interface, a memory and a network interface for communication with a server; and
the memory including computer-executable instructions that, when executed by the processor, cause the processor to:
receive a recipe from the server, the recipe indicating at least two ingredients, appliance data and at least one action, the appliance data indicating at least a portion of an operating code to operate an appliance and the action including transmitting the portion of the operating code to the appliance;
establish communication with the appliance; and
transmit the portion of the operating code to the appliance.

2. The system of claim 1, wherein the computer-executable instructions further cause the processor to:
render, on the user interface, a first indication associated with the action; receive from the appliance a second indication that an operation of the appliance associated with the portion of the operating code is completed; and
render, on the user interface, a third indication associated with a completion of the operation of the appliance associated with the portion of the operating code is completed.

3. The system of claim 2, wherein the portion of the operating code includes at least a plurality of appliance operations, and wherein the computer-executable instructions further cause the processor to:
for each of the plurality of the appliance operations:
receive from the appliance another indication that the one of the plurality of appliance operations is in progress; and
render, on the user interface, the another indication.

4. The system of claim 1, wherein the recipe further indicating an identification of the appliance and wherein the computer-executable instructions further cause the processor to establish communication with the appliance by detecting the appliance indicated by the recipe.

5. The system of claim 1, wherein the appliance data is for a plurality of appliances, the appliance data including the at least a portion of the operating code for one or more of the plurality of appliances, the appliance of the plurality of appliances including the operating code and a different appliance of the plurality of appliances including a different operating code, and wherein the computer-executable instructions further cause the processor to:

establish communication with the appliance further including:
receive an identification of the appliance;
identify the appliance from the plurality of appliances; and
identify the operating code for the appliance.

6. The system of claim 1, wherein the appliance data is based, at least in part, on one or more appliance operations associated with at least one of the recipe, the appliance, a container, the recipe and the appliance, the recipe and the container, the appliance and the container, a contribution by each of the recipe, the appliance and the container, or a prerecording of processing of the appliance.

7. The system of claim 2, wherein at least one of the first indication or the third indication includes a representation of one or more of text, alphanumeric characters, graphs, graphics, scale, charts, visual indications, audio indications, video indications or other depictions.

8. The system of claim 3, wherein the another indication includes a representation of one or more of text, alphanumeric characters, graphs, graphics, scale, charts, visual indications, audio indications, video indications or other depictions.

9. The system of claim 8, wherein the another indication further includes a dynamic aspect of the one or more of the text, the alphanumeric characters, the graphs, the graphics, the scale, the charts, the visual indications, the audio indications, the video indications or the other depictions.

10. A system, comprising:
a computing device having at least one processor, at least one user interface, a memory and a network interface for communication with a server, the memory including computer-executable instructions that, when executed by the at least one processor, cause the at least one processor to:
receive a recipe from the server, the recipe indicating at least two ingredients and at least one action, the action including at least one appliance operation;
establish communication with an appliance; and
transmit the at least one appliance operation to the appliance.

11. The system of claim 10, wherein the appliance operation is based, at least in part, on at least one of the recipe, the appliance, a container, the recipe and the appliance, the recipe and the container, the appliance and the container, a contribution by each of the recipe, the appliance and the container, or a prerecording of processing by the appliance.

12. The system of claim 10, wherein the computer-executable instructions further cause the processor to:
render, on the user interface, a first indication associated with the action; receive from the appliance a second indication that an operation of the appliance associated with the at least one appliance operation is completed; and
render, on the user interface, a third indication associated with a completion of the operation of the appliance associated with the at least one appliance operation is completed.

13. The system of claim 10, wherein the at least one appliance operation includes a plurality of appliance operations, and wherein the computer-executable instructions further cause the processor to:
for each of the plurality of the appliance operations:
receive from the appliance another indication that the one of the plurality of appliance operations is in progress; and
render, on the user interface, the another indication.

14. The system of claim 10, wherein the recipe further indicating an identification of the appliance and wherein the computer-executable instructions further cause the processor to establish communication with the appliance by detecting the appliance indicated by the recipe.

15. The system of claim 12, wherein at least one of the first indication or the third indication includes a representation of one or more of text, alphanumeric characters, graphs, graphics, scale, charts, visual indications, audio indications, video indications or other depictions.

16. The system of claim 13, wherein the another indication includes a representation of one or more of text, alphanumeric characters, graphs, graphics, scale, charts, visual indications, audio indications, video indications or other depictions.

17. The system of claim 16, wherein the another indication further includes a dynamic aspect of the one or more of the text, the alphanumeric characters, the graphs, the graphics, the scale, the charts, the visual indications, the audio indications, the video indications or the other depictions.

18. A method for a computing device having at least one processor, at least one user interface, a memory and a network interface for communication with a server, comprising the steps of:
receiving a recipe from the server, the recipe indicating at least two ingredients and at least one action, the action including at least one appliance operation;
establishing communication with an appliance; and
transmitting the at least one appliance operation to the appliance.

19. The method of claim 18, further comprising the steps of:
rendering, on the user interface, a first indication associated with the action; receiving from the appliance a second indication that an operation of the appliance associated with the at least one appliance operation is completed; and
rendering, on the user interface, a third indication associated with a completion of the operation of the appliance associated with the at least one appliance operation is completed.

* * * * *